United States Patent
Sankar et al.

(10) Patent No.: US 12,205,044 B2
(45) Date of Patent: Jan. 21, 2025

(54) DYNAMIC GRAPH REPRESENTATION LEARNING VIA ATTENTION NETWORKS

(71) Applicant: Visa International Service Association, San Francisco, CA (US)

(72) Inventors: Aravind Sankar, Urbana, IL (US); Yanhong Wu, Mountain View, CA (US); Liang Gou, San Jose, CA (US); Wei Zhang, San Francisco, CA (US); Hao Yang, San Jose, CA (US)

(73) Assignee: Visa International Service Association, San Francisco, CA (US)

(*) Notice: Subject to any disclaimer, the term of this patent is extended or adjusted under 35 U.S.C. 154(b) by 995 days.

(21) Appl. No.: 17/273,275

(22) PCT Filed: Sep. 24, 2019

(86) PCT No.: PCT/US2019/052703
§ 371 (c)(1),
(2) Date: Mar. 3, 2021

(87) PCT Pub. No.: WO2020/068831
PCT Pub. Date: Apr. 2, 2020

(65) Prior Publication Data
US 2021/0326389 A1 Oct. 21, 2021

Related U.S. Application Data

(60) Provisional application No. 62/736,953, filed on Sep. 26, 2018.

(51) Int. Cl.
*G06N 5/022* (2023.01)
*G06F 16/901* (2019.01)
*G06F 18/214* (2023.01)
*G06N 3/08* (2023.01)
*G06N 20/10* (2019.01)

(52) U.S. Cl.
CPC ......... *G06N 5/022* (2013.01); *G06F 16/9024* (2019.01); *G06F 18/214* (2023.01); *G06N 3/08* (2013.01); *G06N 20/10* (2019.01)

(58) Field of Classification Search
CPC .......... G06N 5/022; G06N 3/08; G06N 20/10; G06N 3/045; G06N 3/048; G06F 16/9024; G06F 18/214
See application file for complete search history.

(56) References Cited

U.S. PATENT DOCUMENTS

2018/0189265 A1 7/2018 Chen et al.

OTHER PUBLICATIONS

Huan Song, Deepta Rajan, Jayaraman J. Thiagarajan, Andreas Spanias, "Attend and Diagnose: Clinical Time Series Analysis Using Attention Models" AAAI Conference-18 (Year: 2018).*

(Continued)

*Primary Examiner* — Hope C Sheffield
(74) *Attorney, Agent, or Firm* — Kilpatrick Townsend & Stockton LLP

(57) ABSTRACT

A method includes extracting, by an analysis computer, a plurality of first datasets from a plurality of graph snapshots using a structural self-attention module. The analysis computer can then extract at least a second dataset from the plurality of first datasets using a temporal self-attention module across the plurality of graph snapshots. The analysis computer can then perform graph context prediction with at least the second dataset.

16 Claims, 15 Drawing Sheets

(56) References Cited

OTHER PUBLICATIONS

Ashish Vaswani, Noam Shazeer, Niki Parmar, Jakob Uszkoreit, Llion Jones, Aidan N. Gomez, Åukasz Kaiser, Illia Polosukhin "Attention is All You Need", NIPS 2017 (Year: 2017).*
Giang Hoang Nguyen, John Boaz Lee, Ryan A. Rossi, Nesreen K. Ahmed, Eunyee Koh, Sungchul Kim, "Continuous-Time Dynamic Network Embeddings" BigNet 2018 Workshop (Year: 2018).*
Sami Abu-El-Haija, Bryan Perozzi, Rami Al-Rfou, Alex Alemi, "Watch Your Step: Learning Node Embeddings via Graph Attention", NIPS 2018 (Year: 2018).*
El-Haija et al., "Watch Your Step: Learning Node Embeddings via Graph Attention", arXiv:1710.09599v1, 2018, 9 pages.
Nguyen et al., "Continuous-Time Dynamic Network Embeddings", Companion Proceedings of the the Web Conference 2018, Apr. 23-27, 2018, pp. 969-976.
Wan et al., "Future Automation Engineering using Structural Graph Convolutional Neural Networks", arXiv:1808.08213, 2018, 9 pages.
Application No. PCT/US2019/052703, International Search Report and Written Opinion, Mailed on Jan. 15, 2020, 11 pages.

* cited by examiner

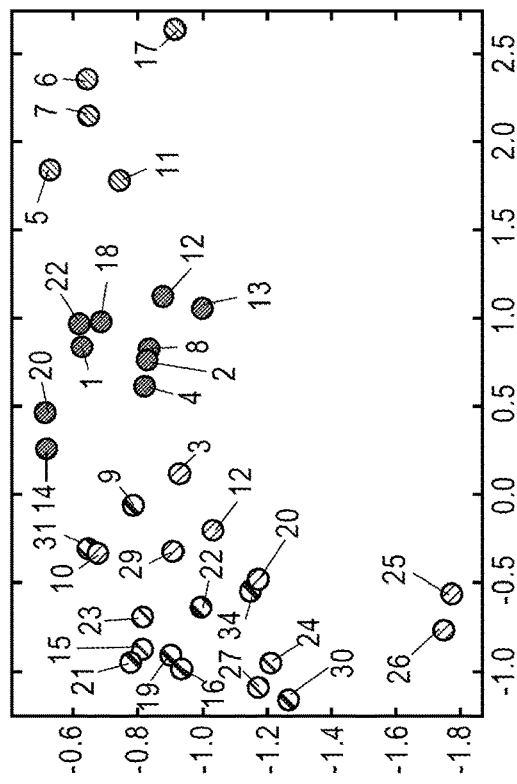
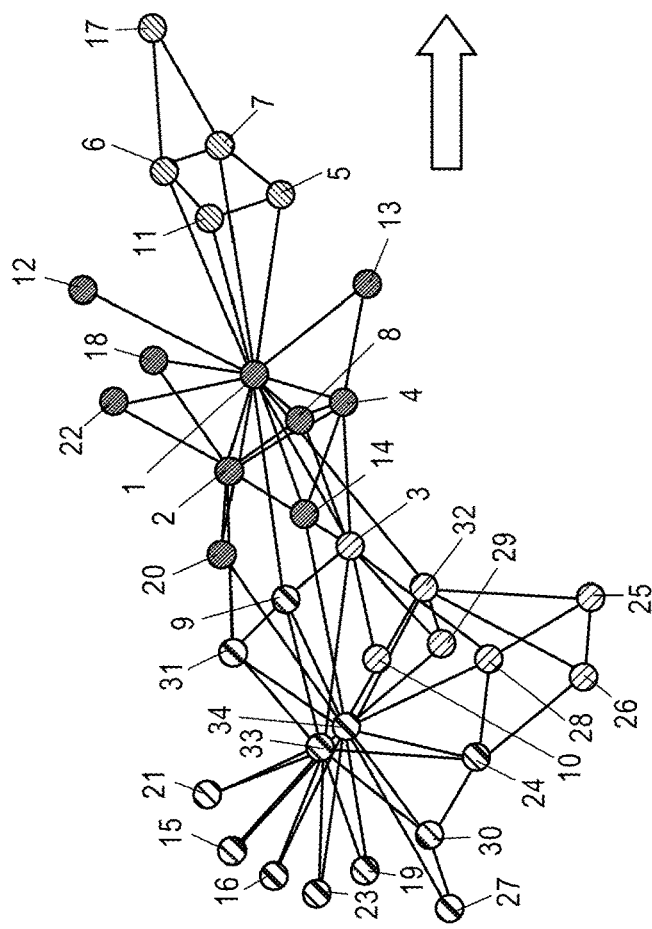
FIG. 3

DYNAMIC GRAPH REPRESENTATION LEARNING VIA ATTENTION NETWORKS

CROSS-REFERENCE TO RELATED APPLICATIONS

This application is a 371 patent application of International Application No. PCT/US2019/052703, filed Sep. 24, 2019, which claims the benefit of U.S. Provisional Application No. 62/736,953, filed Sep. 26, 2018, which is herein incorporated by reference in its entirety for all purposes.

BACKGROUND

Learning latent representations (e.g., embeddings) of nodes in graphs is an important and ubiquitous task with widespread applications such as link prediction, node classification, and visualization. However, a vast majority of real-world graphs are dynamic and evolve over time, such as email communication, collaboration, and interaction graphs. Despite the recent success of neural graph representation learning, almost all existing methods focus on static graphs while ignoring the temporal dynamics.

In some cases, when the temporal dynamics of a graph are taken into account, an embedding at a first time-step can be determined, and then an embedding at a second time-step can be determined based on the first embedding of the first time-step. For example, a temporal regularizer is used to enforce smoothness of the embeddings from adjacent time-steps.

However, by doing so, an embedding needs to be determined for every single time-step sequentially, since the embeddings are dependent upon one another. Additionally, any errors, biases, etc. will be propagated through each subsequent embedding due to this dependency on previous embeddings.

Embodiments of the invention address these and other problems individually and collectively.

BRIEF SUMMARY

One embodiment is related to a method comprising: extracting, by an analysis computer, a plurality of first datasets from a plurality of graph snapshots using a structural self-attention module; extracting, by the analysis computer, at least a second dataset from the plurality of first datasets using a temporal self-attention module across the plurality of graph snapshots; and performing, by the analysis computer, graph context prediction with at least the second dataset.

Another embodiment is related to an analysis computer comprising: a processor; and a computer readable medium coupled to the processor, the computer readable medium comprising code, executable by the processor, for implementing a method comprising: extracting a plurality of first datasets from a plurality of graph snapshots using a structural self-attention module; extracting at least a second dataset from the plurality of first datasets using a temporal self-attention module across the plurality of graph snapshots; and performing graph context prediction with the at least the second dataset.

Further details regarding embodiments of the invention can be found in the Detailed Description and the Figures.

BRIEF DESCRIPTION OF THE DRAWINGS

FIG. 3 shows a graph of an example of graph embedding according to some embodiments.

DETAILED DESCRIPTION

Figure 1:
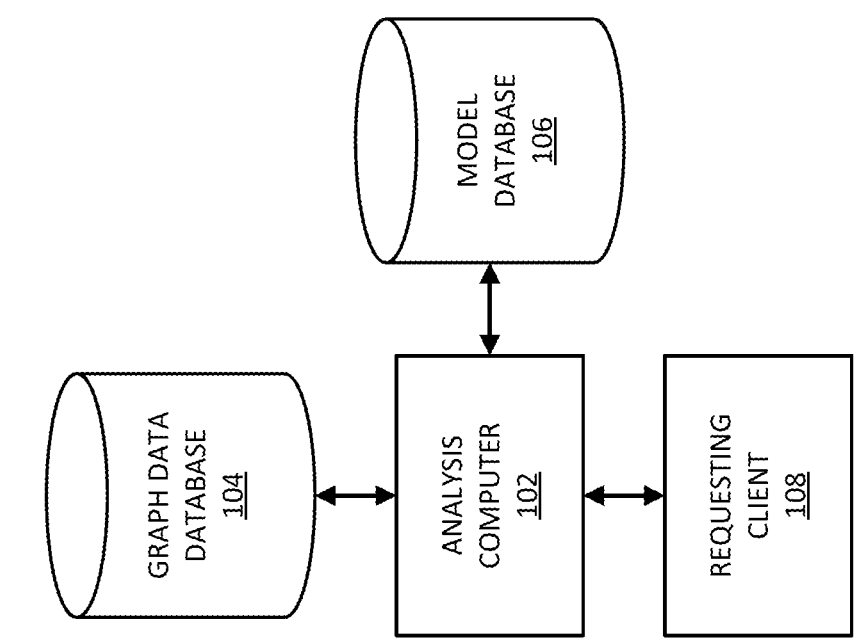
FIG. 1 shows block diagram of a dynamic graph representation learning system according to some embodiments.

Prior to describing embodiments of the disclosure, some terms may be described in detail.

A "machine learning model" may include an application of artificial intelligence that provides systems with the ability to automatically learn and improve from experience without explicitly being programmed. A machine learning model may include a set of software routines and parameters that can predict an output of a process (e.g., identification of an attacker of a computer network, authentication of a computer, a suitable recommendation based on a user search query, etc.) based on a "feature vector" or other input data. A structure of the software routines (e.g., number of subroutines and the relation between them) and/or the values of the parameters can be determined in a training process, which can use actual results of the process that is being modeled, e.g., the identification of different classes of input data. Examples of machine learning models include support vector machines (SVM), models that classify data by establishing a gap or boundary between inputs of different classifications, as well as neural networks, which are collections of artificial "neurons" that perform functions by activating in response to inputs. In some embodiments, a neural network can include a convolutional neural network, a recurrent neural network, etc.

A "model database" may include a database that can store machine learning models. Machine learning models can be stored in a model database in a variety of forms, such as collections of parameters or other values defining the machine learning model. Models in a model database may be stored in association with keywords that communicate some aspect of the model. For example, a model used to evaluate news articles may be stored in a model database in association with the keywords "news," "propaganda," and "information." An analysis computer can access a model database and retrieve models from the model database, modify models in the model database, delete models from the model database, or add new models to the model database.

A "feature vector" may include a set of measurable properties (or "features") that represent some object or entity. A feature vector can include collections of data represented digitally in an array or vector structure. A feature vector can also include collections of data that can be represented as a mathematical vector, on which vector operations such as the scalar product can be performed. A feature vector can be determined or generated from input data. A feature vector can be used as the input to a machine learning model, such that the machine learning model produces some output or classification. The construction of a feature vector can be accomplished in a variety of ways, based on the nature of the input data. For example, for a machine learning classifier that classifies words as correctly spelled or incorrectly spelled, a feature vector corresponding to a word such as "LOVE" could be represented as the vector (12, 15, 22, 5), corresponding to the alphabetical index of each letter in the input data word. For a more complex "input," such as a human entity, an exemplary feature vector could include features such as the human's age, height, weight, a numerical representation of relative happiness, etc. Feature vectors can be represented and stored electronically in a feature store. Further, a feature vector can be normalized, i.e., be made to have unit magnitude. As an example, the feature vector (12, 15, 22, 5) corresponding to "LOVE" could be normalized to approximately (0.40, 0.51, 0.74, 0.17).

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate a payment.

A "topological graph" can include a representation of a graph in a plane of distinct vertices connected by edges. The distinct vertices in a topological graph may be referred to as "nodes." Each node may represent specific information for an event or may represent specific information for a profile of an entity or object. The nodes may be related to one another by a set of edges, E. An "edge" may be described as an unordered pair composed of two nodes as a subset of the graph G=(V, E), where is G is a graph comprising a set V of vertices (nodes) connected by a set of edges E. For example, a topological graph may represent a transaction network in which a node representing a transaction may be connected by edges to one or more nodes that are related to the transaction, such as nodes representing information of a device, a user, a transaction type, etc. An edge may be associated with a numerical value, referred to as a "weight," that may be assigned to the pairwise connection between the two nodes. The edge weight may be identified as a strength of connectivity between two nodes and/or may be related to a cost or distance, as it often represents a quantity that is required to move from one node to the next. In some embodiments, a graph can be a dynamic graph, which may change over time. For example, nodes and/or edges may be added to and/or removed from the graph.

A "subgraph" or "sub-graph" can include a graph formed from a subset of elements of a larger graph. The elements may include vertices and connecting edges, and the subset may be a set of nodes and edges selected amongst the entire set of nodes and edges for the larger graph. For example, a plurality of subgraph can be formed by randomly sampling graph data, wherein each of the random samples can be a subgraph. Each subgraph can overlap another subgraph formed from the same larger graph.

A "community" can include a group of nodes in a graph that are densely connected within the group. A community may be a subgraph or a portion/derivative thereof and a subgraph may or may not be a community and/or comprise one or more communities. A community may be identified from a graph using a graph learning algorithm, such as a graph learning algorithm for mapping protein complexes. Communities identified using historical data can be used to classify new data for making predictions. For example, identifying communities can be used as part of a machine learning process, in which predictions about information elements can be made based on their relation to one another.

The term "node" can include a discrete data point representing specified information. Nodes may be connected to one another in a topological graph by edges, which may be assigned a value known as an edge weight in order to describe the connection strength between the two nodes. For example, a first node may be a data point representing a first device in a network, and the first node may be connected in a graph to a second node representing a second device in the network. The connection strength may be defined by an edge weight corresponding to how quickly and easily information may be transmitted between the two nodes. An edge weight may also be used to express a cost or a distance required to move from one state or node to the next. For example, a first node may be a data point representing a first position of a machine, and the first node may be connected in a graph to a second node for a second position of the machine. The edge weight may be the energy required to move from the first position to the second position.

"Graph data" can include data represented as a topological graph. For example, graph data can include data represented by a plurality of nodes and edges. Graph data can include any suitable data (e.g., interaction data, communication data, review data, network data, etc.).

A "graph snapshot" can include graph data within a time range. For example a graph snapshot may include graph data occurring during a 3 day, 1 week, 2 month, etc. period of time.

A "graph context prediction" can include any suitable prediction based on graph data. In some embodiments, the prediction can relate to the context of at least some part of the graph or the graph data. For example, if the graph data was formed from weather data, then the prediction may relate to predicting the weather in a particular location. In some embodiments, a graph context prediction may be made by a machine learning model that is formed using final node representations, which may correspond to data from second data sets. In some embodiments, the graph context prediction may be a classification by a machine learning model of some input data.

"Vector representations" can include vectors which represent something. In some embodiments, vector representations can include vectors which represent nodes from graph data in a vector space. In some embodiments, vector representations can include embeddings.

A "dataset" can include a collection of related sets of information that can be composed of separate elements but can be manipulated as a unit by a computer. In some embodiments, a dataset can include a plurality of vectors. For example, in some embodiments, a first dataset can include a plurality of intermediate vector representations, and a second dataset can include a plurality of final node representations.

A "server computer" may include a powerful computer or cluster of computers. For example, the server computer can be a large mainframe, a minicomputer cluster, or a group of servers functioning as a unit. In one example, the server computer may be a database server coupled to a web server. The server computer may comprise one or more computational apparatuses and may use any of a variety of computing structures, arrangements, and compilations for servicing the requests from one or more client computers.

A "memory" may include any suitable device or devices that may store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" can include to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

I. Introduction

Embodiments of the disclosure, in some cases also referred to as Dynamic Self-Attention Network (DySAT), can operate on dynamic graphs and learn node representations that capture both structural features and temporal evolution patterns. Embodiments may allow an analysis computer to compute node representations by employing self-attention layers along two dimensions: structural neighborhood and temporal dynamics. In contrast to most existing techniques based on temporal smoothness, dynamic self-attention of embodiments can enable learning adaptive temporal evolution patterns at a fine-grained node-level granularity. Further, dynamic link prediction experiments are conducted on two diverse classes of graphs: communication and rating network datasets. The experimental results indicate significant performance gains of embodiments over existing dynamic graph embedding baselines and state-of-the-art static graph neural networks.

Learning latent representations (or embeddings) of nodes in graphs has been recognized as a fundamental learning problem due to widespread use in various domains such as biology (Grover & Leskovec, 2016), social media (Perozzi et al., 2014), and knowledge bases (Wang et al., 2014). The idea is to encode structural properties (and possibly attributes) of a node's neighborhood into a low-dimensional vector. Such low-dimensional representations can benefit a plethora of graph analytical tasks such as node classification, link prediction, and graph visualization (Perozzi et al., 2014; Grover & Leskovec, 2016; Wang et al., 2016; Tang et al., 2015).

Previous work on graph representation learning mainly focuses on static graphs, which contain a fixed set of nodes and edges. However, many graphs in real-world applications are intrinsically dynamic, in which graph structures can evolve over time. A dynamic graph may be represented as a sequence of graph snapshots from different time steps (Leskovec et al., 2007). Examples include academic co-authorship networks in which authors may periodically switch their collaboration behaviors and email communication networks whose structures may change dramatically due to sudden events. In such scenarios, modeling temporal evolutionary patterns can be important in accurately predicting node properties and future links.

Learning dynamic node representations is challenging, compared to static settings, due to the complex time-varying graph structures. For example, nodes can emerge and leave, links (e.g., edges) can appear and disappear, and communities can merge and split. This may require the learned embeddings not only to preserve structural proximity of nodes, but also to jointly capture the temporal dependencies over time. Although some recent work attempts to learn node representations in dynamic networks, they mainly impose a temporal regularizer to enforce smoothness of the node representations from adjacent snapshots, see (Zhu et al., 2016; Li et al., 2017; Zhou et al., 2018). However, these approaches fail when nodes exhibit significantly distinct evolutionary behaviors. Trivedi et al., (2017) employ a recurrent neural architecture for temporal reasoning in multi-relational knowledge graphs. However, this approach learns temporal node representations by focusing only on link-level evolution, while ignoring the structure of local graph neighborhoods.

Attention mechanisms have recently achieved great success in many sequential learning tasks such as machine translation (Bandanau et al., 2015) and reading comprehension (Yu et al., 2018). An underlying principle of attention mechanisms can be to learn a function that aggregates a variable-sized input, while focusing on the parts most relevant to a certain context. When the attention mechanism uses a single sequence as both the inputs and the context, it is often named as self-attention. Though attention mechanisms were initially designed to facilitate Recurrent Neural Networks (RNNs) to capture long-term dependencies, recent work by (Vaswani et al., (2017)) demonstrate that a fully self-attentional network itself can achieve state-of-the-art performance in machine translation tasks. (Velickovic et al., (2018)) extend self-attention on graphs by enabling each node to attend over its neighbors, achieving state-of-the-art results for semi-supervised node classification tasks in static graphs.

In contrast, embodiments of the disclosure provide a novel neural architecture to learn node representations on dynamic graphs. Specifically, embodiments can employ self-attention along two dimensions: structural neighborhoods and temporal dynamics. For example, embodiments can allow for an analysis computer to generate a node representation by considering both the node's neighbors and the node's historical representations, following a self-attentional strategy. Unlike static graph embedding methods that focus entirely on preserving structural proximity, embodiments can learn dynamic node representations that reflect the temporal evolution of graph structure over the varying number of historical snapshots. Embodiments can be capable of accurately capturing both structural properties and temporal evolution patterns. In stark contrast to temporal smoothness-based methods, embodiments can learn attention weights that capture temporal dependencies at a fine-grained node-level granularity.

Further, embodiments are evaluated on a dynamic link prediction task using four benchmarks of different sizes including two email communication networks (Klimt & Yang, 2004; Panzarasa et al., 2009) and two bipartite rating networks (Harper & Konstan, 2016). The evaluation results, described herein, show that embodiments achieve significant improvements (approximately 5% on average) over several state-of-the-art baselines and maintain a more stable performance over different time steps.

A. System Overview

FIG. 1 shows a block diagram of a system 100 comprising a number of components according to some embodiments. The system 100 comprises an analysis computer 102, a graph data database 104, a model database 106, and a requesting client 108. The analysis computer 102 can be in operative communication with the graph data database 104, the model database 106, and the requesting client 108 (e.g., a remote computer).

For simplicity of illustration, a certain number of components are shown in FIG. 1. It is understood, however, that embodiments of the disclosure may include more than one of each component. In addition, some embodiments of the disclosure may include fewer than or greater than all of the components shown in FIG. 1.

Messages between the devices of system 100 in FIG. 1 can be transmitted using a secure communications protocols such as, but not limited to, File Transfer Protocol (FTP); HyperText Transfer Protocol (HTTP); Secure Hypertext Transfer Protocol (HTTPS), SSL, ISO (e.g., ISO 8583) and/or the like. The communications network may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

The graph data database 104 may securely store graph data. The graph data database 104 can store graph data (e.g., topological graph data). In some embodiments, the graph data database 104 may store a plurality of graph snapshots of a dynamic graph.

The model database 106 can securely store models. For example, the analysis computer 102 can create a model (e.g., a machine learning model) and can store the model in the model database 106. In some embodiments, the graph data database 104 and the model database 106 may be conventional, fault tolerant, relational, scalable, secure databases such as those commercially available from Oracle™, Sybase™, etc.

The analysis computer 102 can be capable of performing dynamic graph representation learning via self-attention networks as described herein. The analysis computer 102 can be capable of retrieving graph data from the graph data database 104. In some embodiments, the analysis computer 102 can be capable of retrieving graph snapshots from the graph data database 104.

The analysis computer 102 can be capable of extracting a plurality of first datasets from a plurality of graph snapshots using a structural self-attention module. The analysis computer 102 can then be capable of extracting at least a second dataset from the plurality of first datasets using a temporal self-attention module across the plurality of graph snapshots. Extraction of the plurality of first datasets can the second dataset are described in further detail herein. The analysis computer 102 can also be capable of performing graph context prediction with at least the second dataset.

The requesting client 108 can include any suitable device external to the analysis computer 102. In some embodiments, the requesting client 108 may receive outputs and/or decisions made by the analysis computer 102. In other embodiments, the requesting client 108 can transmit a request (e.g., a prediction request) to the analysis computer 102. The request can include request data regarding a model. The requesting client 108 can request the analysis computer 102 to run a model to, for example, predict whether or not two nodes of the graph data will be connected via an edge in a future graph snapshot. After receiving the request comprising request data, the analysis computer 102 can determine output data. For example, the analysis computer 102 can input the request data into the model to determine output data, output by the model. The analysis computer 102 may then provide the output data to the requesting client 108.

For example, in some embodiments, the analysis computer 102 can receive a prediction request from the requesting client 108. The prediction request can comprise, for example, a request for a prediction of whether or not a first author represented by a first node in collaboration graph data will be connected to (e.g., perform research with) a second author represented by a second node at a future point in time.

The analysis computer 102 can then determine a prediction based on at least performing graph context prediction with at least the second dataset. For example, the analysis computer 102 can predict whether or not the first author and the second author will collaborate on a research paper at a given time-step in the future using a model created as described herein. For example, the analysis computer 102 may determine that the two authors are predicted as being 90% likely to collaborate on a research paper within the next year.

After determining the prediction, the analysis computer 102 can transmit a prediction response comprising at least the prediction to the requesting client 108. For example, the analysis computer 102 can provide the prediction that the two authors are likely to collaborate within the next year.

B. Analysis Computer

Figure 2:
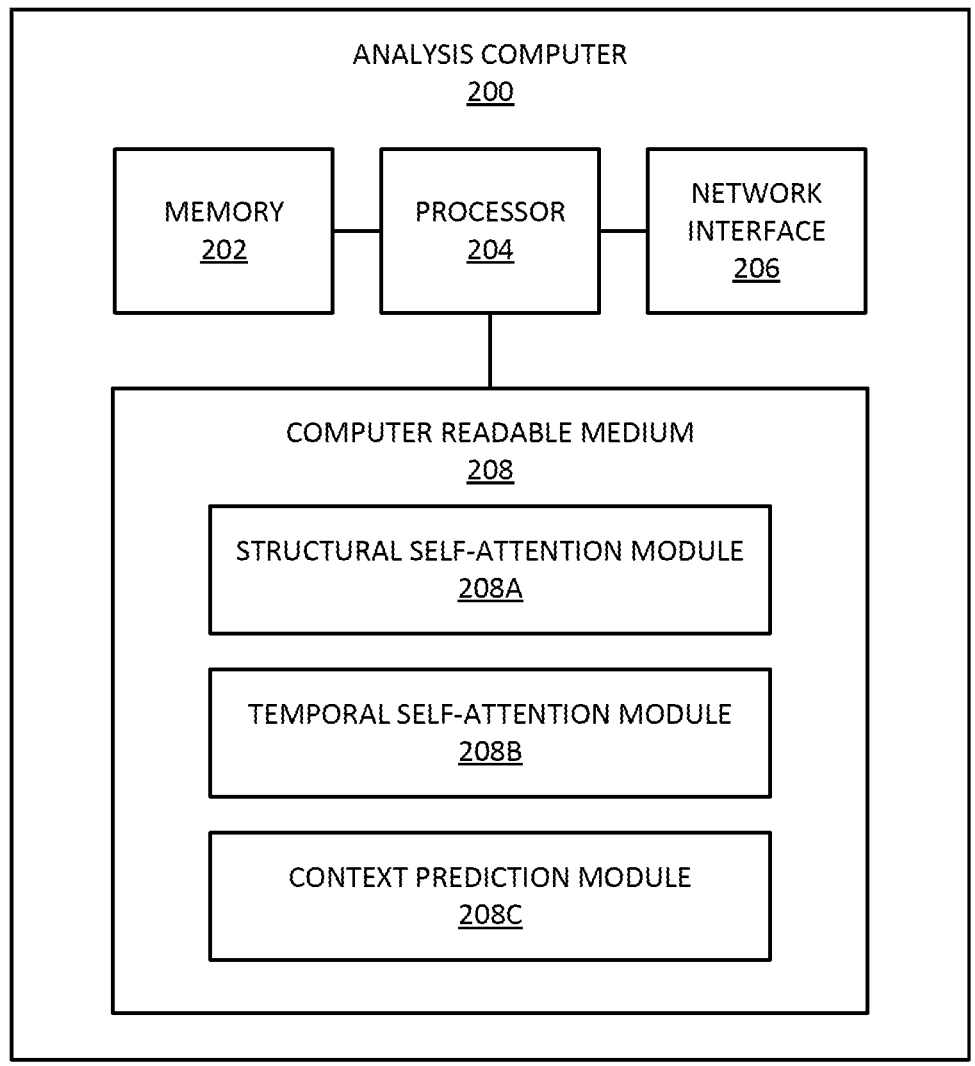
FIG. 2 shows a block diagram of an analysis computer according to some embodiments.

FIG. 2 shows a block diagram of an analysis computer 200 according to embodiments. The exemplary analysis computer 200 may comprise a processor 204. The processor 204 may be coupled to a memory 202, a network interface 206, input elements 210, output elements 212, and a computer readable medium 208. The computer readable medium 208 can comprise a structural self-attention module 208A, a temporal self-attention module 208B, and a context prediction module 208C.

The memory 202 can be used to store data and code. The memory 202 may be coupled to the processor 204 internally or externally (e.g., cloud based data storage), and may comprise any combination of volatile and/or non-volatile memory, such as RAM, DRAM, ROM, flash, or any other suitable memory device. For example, the memory 202 can store graph data, vectors, datasets, etc.

The computer readable medium 208 may comprise code, executable by the processor 204, for performing a method comprising: extracting, by an analysis computer, a plurality of first datasets from a plurality of graph snapshots using a structural self-attention module; extracting, by the analysis computer, at least a second dataset from the plurality of first datasets using a temporal self-attention module across the plurality of graph snapshots; and performing, by the analysis computer, graph context prediction with at least the second dataset.

The structural self-attention module 208A may comprise code or software, executable by the processor 204, for performing structural self-attention. The structural self-attention module 208A, in conjunction with the processor 204, can attend over immediate neighboring nodes of a particular node (e.g., node v). For example, the structural self-attention module 208A, in conjunction with the processor 204, can attend over the immediate neighboring nodes by determining attention weights (e.g., in an attentional neural network) as a function of the input nodes. In some embodiments, the structural self-attention module 208A, in conjunction with the processor 204, can determine intermediate vector representations for each node for each snapshot of the plurality of graph snapshots using equation (1), described in further detail below. The structural self-attention module 208A, in conjunction with the processor 204, can determine intermediate vector representations for each graph snapshot independently of other graph snapshots.

For example, the structural self-attention module 208A, in conjunction with the processor 204, can receive a first graph snapshot of graph data (e.g., a dynamic graph). The graph data may be communication data which includes particular users (e.g., represented as nodes) and communications between the users (e.g., represented as edges). The structural self-attention module 208A, in conjunction with the processor 204, can first determine what nodes are connected to a first node (e.g., a first user in the communication network). The nodes connected (via edges) to the first user can be neighboring nodes. The neighboring nodes of the first node can be used when determining the embedding of the first node. In such a way, attention may be placed on the first node's neighboring nodes when determining the vector representation of the first node, thus capturing structural patterns in the graph data.

The temporal self-attention module 208B may comprise code or software, executable by the processor 204, for performing temporal self-attention. The temporal self-attention module 208B, in conjunction with the processor 204, can capture temporal evolutionary patterns in the graph data over a plurality of graph snapshots. The input to the temporal self-attention module 208B can include the intermediate vector representations determined by the structural self-attention module 208A, in conjunction with the processor 204. For example, the temporal self-attention module 208B, in conjunction with the processor 204, can accept, as input, at least the vector representation of the first node from each graph snapshot. The vector representation of the first node can constitute an encoding of a local structure around the first node. In some embodiments, the temporal self-attention module 208B, in conjunction with the processor 204, can extract at least a second dataset from the plurality of first datasets across the plurality of graph snapshots using equation (2), as described in further detail below.

For example, the structural self-attention module 208A, in conjunction with the processor 204, can determine an intermediate vector representation of the first node. A plurality of intermediate vector representations can include the intermediate vector representation of the first node at each graph snapshot. The temporal self-attention module 208B, in conjunction with the processor 204, can then receive the plurality of intermediate vector representations of the first node. The temporal self-attention module 208B, in conjunction with the processor 204, can utilize the plurality of intermediate vector representations to attend (e.g., in an attentional neural network) over the first node's historical representations, tracing the evolution of the local neighborhood around the first node. By tracing the changes of the first node's local neighborhood, the temporal self-attention module 208B, in conjunction with the processor 204, can determine a final node representation for the first node for the graph data. The final node representation can be a vector which represents the change in the intermediate vector representations over time. Thus, the final node representation can encode data regarding the structure of the graph as well as the change of the structure over time.

For example, the final node representation of the first node may represent the first user's communication habits and how they evolve over time. The first node may communicate with a particular group of nodes through a portion of time, then drift to communicating with a different group of nodes. The final node representation of the first node can be formed such that it indicates the first user's change in communication.

In some embodiments, the analysis computer can create any suitable type of model using at least the second dataset, for example, the model can include a machine learning model (e.g., support vector machines (SVMs), artificial neural networks, decision trees, Bayesian networks, genetic algorithms, etc.). In some embodiments, the model can include a mathematical description of a system or process to assist calculations and predictions (e.g., a fraud model, an anomaly detection model, etc.).

For example, analysis computer 200 can create a model, which may be a statistical model, which can be used to predict unknown information from known information. For example, the analysis computer 200 can include a set of instructions for generating a regression line from training data (supervised learning) or a set of instructions for grouping data into clusters of different classifications of data based on similarity, connectivity, and/or distance between data points (unsupervised learning). The regression line or data clusters can then be used as a model for predicting unknown information from known information.

Once the model has been built from at least the second dataset by the analysis computer, the model may be used to generate a predicted output from a request by the context prediction module 208C, in conjunction with the processor 204. The context prediction module 208C can include may comprise code or software, executable by the processor 204, for performing context prediction. For example, the received request may be a request for a prediction associated with presented data. For example, the request may be a request for classifying an transaction as fraudulent or not fraudulent, or for a recommendation for a user.

The graph context prediction module 208C, in conjunction with the processor 204, can perform any suitable prediction based on the context of the graph data. For example, the analysis computer 200 can determine a prediction relating to graph data. In some embodiments, the prediction can relate to the context of the graph to which the graph data is associated. The analysis computer 200 can, for example, perform graph context prediction to determine a prediction of whether or not a resource provider and a user will transact at some point in the next week. As an illustrative example, the second dataset, determined by the temporal self-attention module 208B, in conjunction with the processor 204, can be used to train a neural network. For example, the second dataset may correspond to graph data comprising resource providers and users connected via interactions. The neural network can be trained in any suitable manner with the second dataset which includes vectors. In some embodiments, the neural network can be trained to classify input vectors as either, for example, fraud or not fraud. As another example, the neural network can be trained to predict whether or not two nodes will be connected via an edge (e.g., a particular resource provider and user transact) in a future graph snapshot.

The network interface 206 may include an interface that can allow the analysis computer 200 to communicate with external computers. The network interface 206 may enable the analysis computer 200 to communicate data to and from another device (e.g., a requesting client, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

II. Related Work

Embodiments may be related to representation learning techniques on static graphs, dynamic graphs, self-attention mechanisms, etc.

A. Static Graph Embeddings

Early work on unsupervised graph representation learning exploits the spectral properties of various matrix representations of a graph (e.g., Laplacian, etc.) to perform dimensionality reduction (Belkin & Niyogi, 2001; Tenenbaum et al., 2000). To improve scalability to large graphs, more recent work on graph embeddings has established the effectiveness of random walk based methods, inspired by the success of natural language processing. For example, Deepwalk (Perozzi et al., 2014) learns node embeddings by maximizing the co-occurrence probability of nodes appearing within a window, in a random walk. Node2vec (Grover & Leskovec, 2016) extends the model with flexibility between homophily and structural equivalence. In recent years, several graph neural network architectures based on generalizations of convolutions, have achieved tremendous success, with a vast majority of them designed for supervised or semi-supervised learning (Niepert et al., 2016; Defferrard et al., 2016; Kipf & Welling, 2017; Sankar et al., 2017; Velickovic et al., 2018). Further, Hamilton et al., (2017) extend graph convolutional approaches through trainable neighborhood aggregation functions, to propose a general framework applicable to unsupervised representation learning. However, these methods are not designed to model temporal evolutionary behavior in dynamic graphs.

B. Dynamic Graph Embeddings

Most techniques employ temporal smoothness regularization to ensure embedding stability across consecutive timesteps (Zhu et al., 2016; Li et al., 2017). Zhou et al., (2018) additionally use triadic closure (Kossinets & Watts, 2006) as guidance, leading to significant improvements. Neural methods were recently explored in the knowledge graph domain by Trivedi et al., (2017), who employ a recurrent neural architecture for temporal reasoning. However, their model is limited to tracing link evolution, but ignores the local neighborhood while computing node representations. Goyal et al., (2017) learn incremental node embeddings through initialization from the previous time step, which however may not suffice to model historical temporal variations. Unlike previous approaches, embodiments can learn adaptive temporal evolution patterns at a node-level granularity through a self-attentional architecture.

C. Self-Attention

Recent advancements in many Natural Language Processing (NLP) tasks have demonstrated the superiority of self-attention in achieving state-of-the-art performance (Vaswani et al., 2017; Lin et al., 2017; Tan et al., 2018; Shen et al., 2018; Shaw et al., 2018). In embodiments of the disclosure, self-attention can be employed to compute a dynamic node representation by attending over its neighbors and previous historical representations. An approach of some embodiments may include using self-attention over neighbors and may be related to the Graph Attention Network (GAT) (Velickovic et al., 2018), which employs neighborhood attention for semi-supervised node classification in a static graph. Moreover, temporal attention over sequence positions has been widely used in sequential models in NLP tasks, while in stark contrast, embodiments of the disclosure can temporally attend over historical representations of a node to learn dynamic embeddings.

III. Dynamic Self-Attention Network

In some embodiments, an analysis computer can be configured to determine embeddings of graph data. For example, the analysis computer can determine final node representations, which may be final embeddings. The graph representations may then be used in graph context prediction. To determine a graph representation, the analysis computer can retrieve graph data from a graph data database. In some embodiments, after retrieving the graph data, the analysis computer can determine a plurality of graph snapshots from the graph data. In other embodiments, the graph data may be stored as a plurality of graph snapshots in the graph data database, in which case, the analysis computer can retrieve the plurality of graph snapshots in the graph data database.

The analysis computer can then extract a plurality of first datasets from the plurality of graph snapshots using a structural self-attention module. The plurality of first datasets can include, for example, intermediate vector representations for each node for each snapshot of the plurality of graph snapshots. The intermediate vector representations can be vectors representative of the nodes of the graph snapshots. For example, the intermediate vector representations can be in a vector space which may represent characteristics of the graph data. For example, if two nodes of a graph snapshot are similar (e.g., share a plurality of attributes), then the vectors representing the two nodes may be similar in the vector space.

As an illustrative example, graph data can include interaction data (e.g., transaction data, etc.). The graph data can be a dynamic graph comprising a plurality of graph snapshots. Each graph snapshot can include any suitable number of nodes and edges. The nodes of the graph data can represent resource providers and users. Edges may connect a resource provider node to a user node when the two have performed a transaction. The analysis computer can determine a first dataset from each graph snapshot. For example, the analysis computer, for each node, can determine a vector (e.g., an intermediate vector representation) based on a node's neighboring nodes (e.g., local structure). The intermediate vector representation can be determined though a self-attentional neural network, where the analysis computer determines how much attention (e.g., weight) to give to a node's neighboring nodes, based on their influence on the node.

For example, during the self-attentional process, the analysis computer can determine an intermediate vector representation for a first user node. The analysis computer can determine values which represent the attention which can be placed on links between the first user node and each resource provider node that the first user node is connected to. For example, the first user node may be connected via edges to three resource provider nodes including a first resource provider located in San Francisco and provides resources of groceries, a second resource provider located in San Francisco and provides resources of electronics, and a third resource provider located in New York and provides resources of digital books. The analysis computer can attend over the nodes to determine the intermediate vector representation of the first user node. For example, the first user node may be associated with a location of San Francisco and is associated as being a part of an electronics community group. The analysis computer can determine values using the self-attentional neural network, where the inputs can include the first user node and the neighboring nodes, as described in further detail herein. The output of the neural network can include a vector including values representing a degree of how closely the first user node relates to each of the input nodes. For example, in some embodiments, the first user node may most closely relate to itself, as it shares all of its own characteristics. The first user node can then relate to the second resource provider (San Francisco, electronics), the first resource provider (San Francisco, groceries), and the third resource provider (New York, digital books), in descending order of degree of likeness, since the first user node is associated with San Francisco and electronics.

The analysis computer can then extract at least a second dataset from the plurality of first datasets using a temporal self-attention module across the plurality of graph snapshots. The second dataset can include, for example, final node representations for a graph comprising the plurality of graph snapshots. The final node representations can be vectors representative of the changes of the structure of the nodes over time. For example, the final node representations can be in a vector space which may represent characteristics of the graph data. For example, if vectors of the intermediate vector representations are similar over time, then they may be represented by final node representations which are close to one another in a final vector space.

For example, if two nodes representing resource providers portray similar characteristics over time (e.g., both resource providers transact with many users in the summer, but then do not perform many transactions in the winter), then final node representations representing these two resource providers may be close to one another (e.g., the vectors have similar magnitudes and directions). For example, the above described first user node may be associated with an intermediate vector representation which describes the local structure around the first user node (e.g., including weights which describe the relation between the first user node and each neighboring node). Between a first graph snapshot and a second graph snapshot, the local structure around the first user node can change. A temporal self-attentional process can determine how the intermediate vector representations of the first user node change throughout the graph snapshots. In this way, temporal patterns can be determined and encoded into a final node representation which can represent the first user node's local structure over time.

After extracting the second dataset, the analysis computer can perform graph context prediction with at least the second dataset. Graph context prediction can include determining whether or not a first node will interact with a second node in the future. For example, the analysis computer can train any suitable machine learning model using the final node representations. The analysis computer can train a feed forward neural network, for example, capable to determining whether or not two nodes will be connected via an edge in a future graph snapshot.

Illustratively, the analysis computer can determine whether or not a first node representing a resource provider will transact with a second node representing a user (e.g., a consumer) in the next week, month, two months, etc.

A. Problem Definition

A dynamic graph can include a series of observed snapshots, $\mathbb{G}=\{\mathcal{G}^1, \ldots, \mathcal{G}^T\}$ where T can be a number of time-steps. Each snapshot $\mathcal{G}_t=(\mathcal{V}, \mathcal{E}^t, \mathcal{W}^t)$ can be a weighted undirected graph including a shared node set V, a link (e.g., edge) set $\mathcal{E}^t$ and weights $\mathcal{W}^t$, depicting the graph structure at time t. The corresponding weighted adjacency matrix of the graph snapshot $\mathcal{G}_t$ can be denoted by $\mathcal{W}^t$. Unlike some previous works that assume dynamic graphs only grow over time, embodiments of the disclosure can allow for both addition and deletion of links (e.g., edges). Embodiments can allow an analysis computer to learn latent representations $e_v^t \in \mathbb{R}^d$ for each node $v \in \mathcal{V}$ at time-steps $t=1, 2, \ldots, T$, such that the representations $e_v^t$ both preserves the local structure around a node v and models the local structural evolution over time. The latent representations $e_v^t$ can be final node representations.

FIG. 3 shows an example of graph embedding according to embodiments.

An analysis computer can learn a latent vector space representation for a node, such that, two structurally similar nodes of the graph data can be embedded similarly in the vector space. FIG. 3 includes a snapshot of a graph 302 comprising nodes and edges connecting the nodes. FIG. 3 also includes a vector space 304 representation of the graph 302. Although two dimension are illustrated in the vector space 304, it is understood that the vector space 304 can be multi-dimensional.

In some embodiments, an embedding can be a mapping of a discrete or categorical variable to a vector of continuous numbers. In the context of neural networks, embeddings can be low-dimensional, learned continuous vector representations of discrete variables. Neural network embeddings can be useful because they can reduce the dimensionality of categorical variables and meaningfully represent categories in the transformed space. In some embodiments, a vector which may represent the node can be determined using a neural network.

The analysis computer can determine a vector representation for each node in the graph 302. The vector space 304 can illustrate the location of each vector corresponding to each node in a vector space. For example, the node numbered 13 of the graph 302 can be embedded as a vector of [1.1, −1.0] in the vector space 304.

For example, the graph 302 can be a communication network representing users (e.g., nodes) who communicate with one another (e.g., via edges). the node 8 and the node 2 can represent, for example, users who have similar communication habits. The user represented by node 2 may communicate (e.g., via email, phone, text, etc.) with other users as indicated by edges to other nodes of the graph 302. The user represented by node 8 may communicate with many of the same users as done by node 2. As such, node 2 and node 8 may have similar characteristics.

An analysis computer can determine embeddings for the nodes the graph 302. The analysis computer can determine a vector representation of each node of the graph 302. For example, the analysis computer can determine a vector of [0.75, −0.81] for node 2 and a vector of [0.80, =0.82] for node 8 in the vector space 304. Since the nodes 2 and 8 have similar characteristics, the analysis computer can determine similar vectors for the nodes 2 and 8.

B. Model Overview

In this section, the high-level structure of embodiments will be described. Embodiments can comprise at least two components: structural and temporal self-attention layers, which can be used to construct arbitrary neural architectures through stacking of layers. In some embodiments, other components can be present, and can include building blocks such as multi-head attention, etc.

Figure 7:
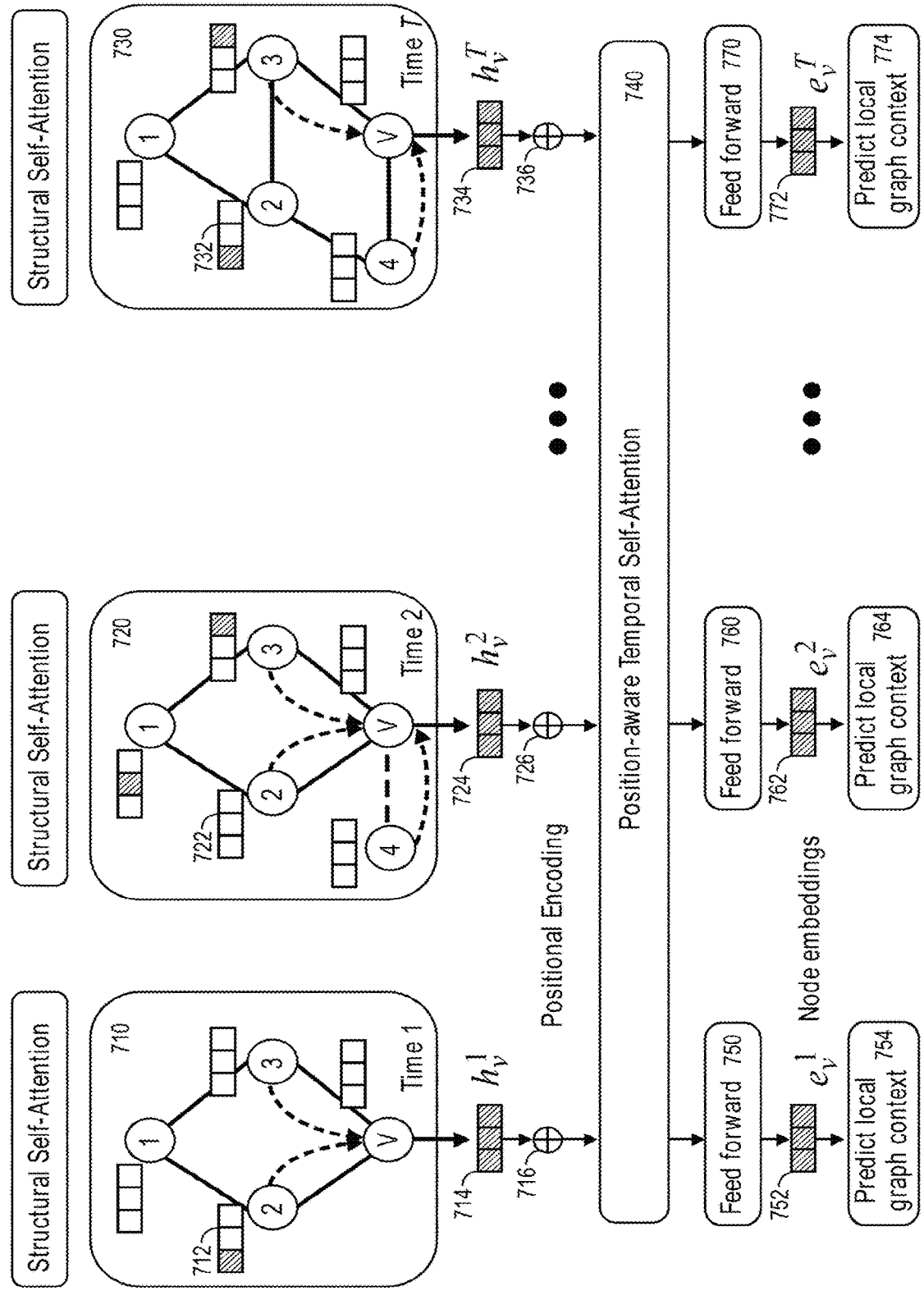
FIG. 7 shows a flow diagram illustrating a DySAT architecture according to some embodiments.

In some embodiments, a structural self-attention block can be followed by a temporal self-attention block, as illustrated in FIG. 7 described below, where each block can contain multiple stacked layers of the respective type. The structural self-attention block can extract features from a local neighborhood (e.g., around a node) through self-attentional aggregation to compute intermediate vector representations for each graph snapshot. These representations can feed as input to the temporal self-attention block, which can attend over multiple time steps, capturing the temporal variations in the graph structure. The output of the temporal self-attention process can include final node representations which may be utilized in training a machine learning model and performing graph context prediction.

C. Dynamic Self-Attention Layers

Next, self-attention layers utilized in embodiments will be described. First, a structural self-attentional layer that operates on a single graph snapshot to compute first-level node representations will be described. Then, a temporal self-attention layer will be described.

1. Structural Self-Attention

Figure 4:
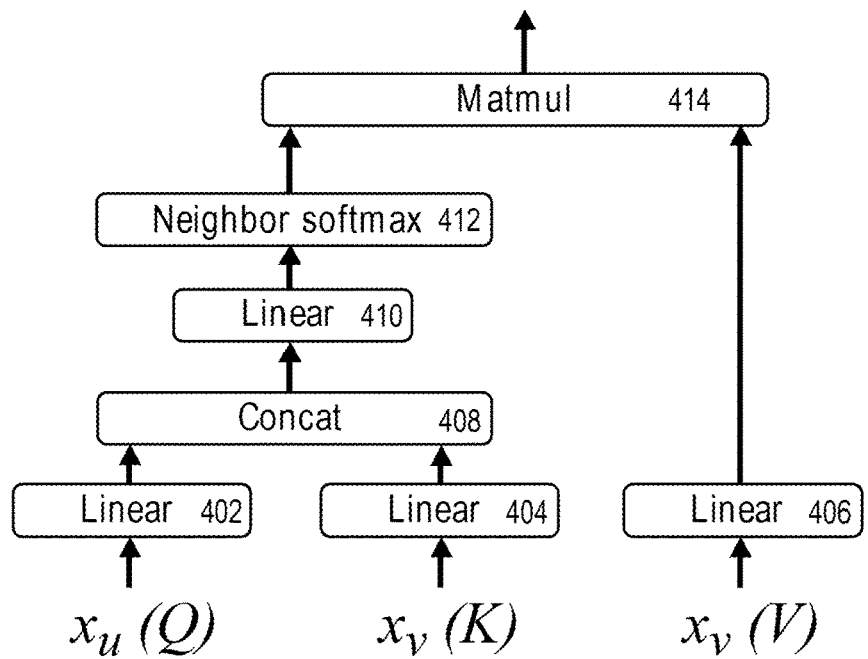
FIG. 4 shows a flow diagram illustrating a method of structural self-attention according to some embodiments.

FIG. 4 shows a flow diagram illustrating a method of structural self-attention according to some embodiments.

The structural self-attention method of FIG. 4 can accept three inputs $x_u(Q)$, $x_v(K)$, and $x_v(V)$. An attention function can be described as mapping a query Q and a set of key-value pairs (e.g., K and V, respectively) to an output, where the query, keys, values, and output can all be vectors, or in some embodiments matrices. The output can be computed as a weighted sum of the values, where the weight assigned to each value is computed by a compatibility function of the query with the corresponding key.

The input to the structural self-attention layer can be a graph snapshot $\mathcal{G} \in \mathbb{G}$, where $\mathbb{G}$ can be a dynamic graph (e.g., graph data), and a set of input node representations $\{x_v \in \mathbb{R}^D, \forall_v \in V\}$ where D can be the dimensionality of the input embeddings. The structural self-attention layer can output a new set of node representations $\{z_v \in \mathbb{R}^F, \forall_v \in V\}$ with dimensionality F. For example, the structural self-attention layer can output intermediate vector representations representing the nodes.

The structural self-attention layer can attend over the immediate neighbors of a node v at time t, by computing attention weights as a function of their input node embeddings. In some embodiments, the structural attention layer can be a variant of GAT (Velickovic et al., 2018), applied on a graph snapshot:

$$Z_v = \sigma\left(\sum_{u \in \mathcal{N}_v} \alpha_{uv} W^s x_u\right), \quad (1)$$

$$\alpha_{uv} = \frac{\exp(\sigma(A_{uv} \cdot a^T [W^s x_u \| W^s x_v]))}{\sum_{w \in \mathcal{N}_v} \exp(\sigma(A_{wv} \cdot a^T [W^s x_w \| W^s x_v]))}$$

In equation (1), above, $\mathcal{N}_v = \{u \in V : (u, v) \in E_t\}$ can be a set of immediate neighbors of node v in the graph snapshot, $W^s \in \mathbb{R}^{D \times F}$ can be a shared weight transformation applied to each node in the graph snapshot. In terms of FIG. 4, an analysis computer can apply different linear transformations at steps 402, 404, and 406 to the query Q, the keys K, and the values V, respectively. The linear transformations can be any suitable linear transformation applied to the query Q, the keys K, and the values V. In equation (1), the linear transformations may be applied, for example, by the shared weight transformation $W^s \in \mathbb{R}^{D \times}$. $a \in \mathbb{R}^{2D}$ can be a weight vector parameterizing the attention function implemented as feed-forward layer.

At step 408, the analysis computer can concatenate the linearly transformed query Q and keys K into a matrix or vector. In some embodiments, at step 410, an additional linear transformation may be applied to the concatenated matrix. For example, in equation (1), ∥ can be a concatenation operation, which can concatenate the linearly transformed query Q and keys K.

$A_{uv}$ can be the weight of link (u, v) in the current graph snapshot g. The set of learned coefficients $\alpha_{uv}$, obtained by a softmax over the neighbors of each node (e.g., at step 412), can indicate an importance or contribution of a node u to a node v in the current graph snapshot. In some embodiments, an analysis computer can utilize sparse matrices to implement a masked self-attention over neighbor nodes.

At step 414, the analysis computer can perform a Matmul process (e.g., matrix multiplication) on the linearly transformed values V (from step 406) as well as the output of step 412. For example, the analysis computer can multiply the learned coefficients, the shared weight transformation, and the correspondent input node representations of a neighboring node (e.g., $\alpha_{uv} W^s x_u$) to determine a value for each of the set of immediate neighboring nodes of node v. The analysis computer can determine a sum of these values which may indicate a weight of each neighboring node's influence on the node v. Then the analysis computer can apply an activation function to the summed value. For example, in equation (1), σ(·) can be a non-linear activation function. For example, in artificial neural networks, an activation function of a node can define an output of that node given an input or set of inputs. The output of the activation function, for example, can include a value ranging from 0 to 1.

2. Temporal Self-Attention

The node representations computed by the structural block can be input to a temporal self-attention layer, which can compute a temporal self-attention independently for each node v over all time steps (e.g., over each graph snapshot). In some embodiments, the temporal self-attention layer can characterize a node at a point in time and how the node relates to itself at other points in time.

For each node v, the input to the temporal self-attention layer can be a set of intermediate vector representations $\{x_v^1, x_v^2, \ldots, x_v^T\}$, $x_v^t \in \mathbb{R}^{D'}$ where T can be a number of time-steps (e.g., graph snapshots) and D' can be a dimensionality of the input vector representations. The output of the layer can be a new set of vector representations (e.g., final node representations) for each node v at each time step (e.g., $z_v = \{z_v^1, z_v^2, \ldots, z_v^T\}$, $z_v^t \in \mathbb{R}^{F'}$ with dimensionality F'). The input and output representations of v, packed together across all graph snapshots, can be denoted by matrices $X_v \in \mathbb{R}^{T \times D'}$ and $Z_v \in \mathbb{R}^{T \times F'}$ respectively.

An objective of the temporal self-attentional layer can be to capture the temporal variations in graph structure over multiple time steps. The input vector representation of the node v at time-step t, $x_v^t$, can constitute an encoding of the current local structure around v. $x_v^t$ can be used as a query to attend over its historical representations (<t), tracing the evolution of the local neighborhood around v. Thus, temporal self-attention facilitates learning of dependencies between various representations of a node across different time steps.

Figure 5:
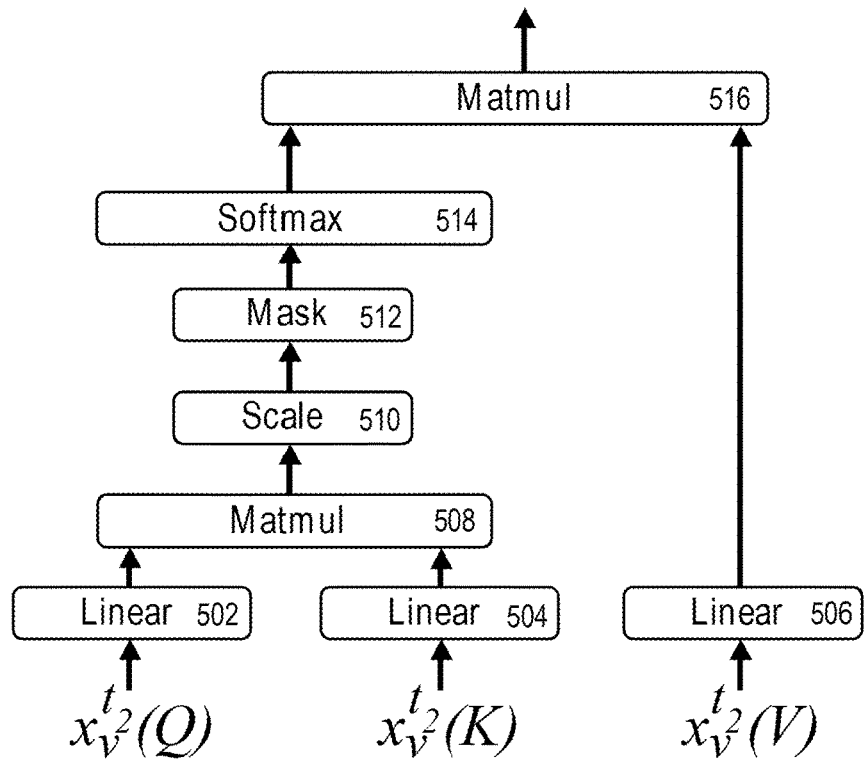
FIG. 5 shows a flow diagram illustrating a method of temporal self-attention according to some embodiments.

FIG. 5 shows a flow diagram illustrating a method of temporal self-attention according to some embodiments. Similar to FIG. 4, the method of FIG. 5 can accept three inputs, here the inputs can be $x_v^t(Q)$, $x_v^t(K)$, and $x_v^t(V)$.

To compute the output representation of node v at t, embodiments can use a scaled dot-product form of attention (Vaswani et al., 2017) where the queries, the keys, and the values may all come from the input vector representations. The queries, the keys, and the values can first be transformed to a different space using linear projections matrices $W_q \in \mathbb{R}^{D' \times F'}$, $W_k \in \mathbb{R}^{D' \times F'}$ and $W_v \in \mathbb{R}^{D' \times F'}$, respectively (e.g., at steps 502-506). Here, embodiments can allow each time-step t to attend over all time-steps up to and including t, to prevent leftward information flow, hence preserving the auto-regressive property.

For example, a form of temporal self-attention used can be given by:

$$Z_v = \beta_v(X_v W_v), \quad (2)$$

$$\beta_v^{ij} = \frac{\exp(e_v^{ij})}{\sum_{k=1}^T \exp(e_v^{ik})},$$

$$e_v^{ij} = \left(\frac{((X_v W_q)(X_v W_k)^T)_{ij}}{\sqrt{F'}} + M_{ij}\right)$$

At step 508, a Matmul function can be applied to the linear projected matrices from the query Q and the keys K. Matmul can be a transformational function that works on arrays. For example, Matmul can takes two matrices (e.g., of rank one or two) and preform matrix multiplication on them. In equation (2), above, $\sqrt{F'}$ can be a scaling factor (e.g., at step 510) which can scale the linear projected matrices by the dimensionality F'. Further, $\beta_v \in \mathbb{R}^{T \times T}$ can be an attention weight matrix obtained by the multiplicative attention function and $M \in \mathbb{R}^{T \times T}$ can be a mask matrix (e.g., at step 512) with each entry $M_{ij} \in \{-\infty, 0\}$. When $M_{ij} = -\infty$, the softmax function (e.g., at step 514) can result in a zero attention weight, i.e., $\beta_v^{ij} = 0$, which can switch off the attention from time-step i to j. To encode the temporal order, the mask matrix M can be defined as, $$M_{ij} = \begin{cases} 0, & i \leq j \\ -\infty, & \text{otherwise} \end{cases}$$

After applying the softmax function at step 514, the output of the softwax function can be multiplied by the linear projected matrix from the values V, yielding the output vector representative of the change in the local structure of the node of the query Q over time.

Further details regarding FIG. 5 can be found in [Ashish Vaswani et al., In *Advances in Neural Information Processing Systems* 30: *Annual Conference on Neural Information Processing Systems* 2017, 4-9 Dec. 2017, Long Beach, CA, USA, pp. 6000-6010,2017], which is incorporated herein by reference for all purposes.

As an example, in terms of a self-attention mechanism which translates sentences from one language to another, the query Q can be an input sentence which can be translated. The keys K can be a hidden encoder state. For example, the keys K may be words (in a vector format) which relate to the input query Q sentence. The values V can then be values determined by the keys K and attention scores given to each of the keys K. In some embodiments, the query Q can include a particular node in a graph snapshot. The keys K can include the neighboring nodes (e.g., nodes connected via edges) to the node of the query Q. The values V can be attention scores for the connections between the node of the query Q and the neighboring nodes of the keys K.

As another example, a query vector, a key vector, and a value vector can be created. These vectors can be created by multiplying the embedding by, for example, three matrices that are trained during a training process. In some embodiments, calculating attention may be performed by first, taking the query and each key and compute the similarity between the two to obtain a weight. The analysis computer can utilize any suitable similarity function, for example, dot product, splice, detector, etc. Then the analysis computer can use a softmax function to normalize these weights, and can weight these weights in conjunction with the corresponding values and obtain the final attention.

3. Multi-Head Attention

In some embodiments, the analysis computer can additionally employ multi-head attention (Vaswani et al., 2017) to jointly attend to different subspaces at each input, leading to a leap in model capacity. Embodiments can use multiple attention heads, followed by concatenation, in both structural and temporal self-attention layers, as summarized below:

Structural multi-head self-attention: $h_v = \text{Concat}(z_v^1, z_v^2, \ldots, z_v^H) \forall v \in V$ (3)

Temporal multi-head self-attention: $H_v = \text{Concat}(Z_v^1, Z_v^2, \ldots, Z_v^H) \forall v \in V$ (4)

In equations (3) and (4), above, H can be a number of attention heads. $h_v \in \mathbb{R}^F$ and $H_v \in \mathbb{R}^{T \times F'}$ can be the outputs of structural and temporal multi-head attentions respectively. While structural attention can be applied on a single snapshot, temporal attention can operate over multiple time-steps.

Figure 6:
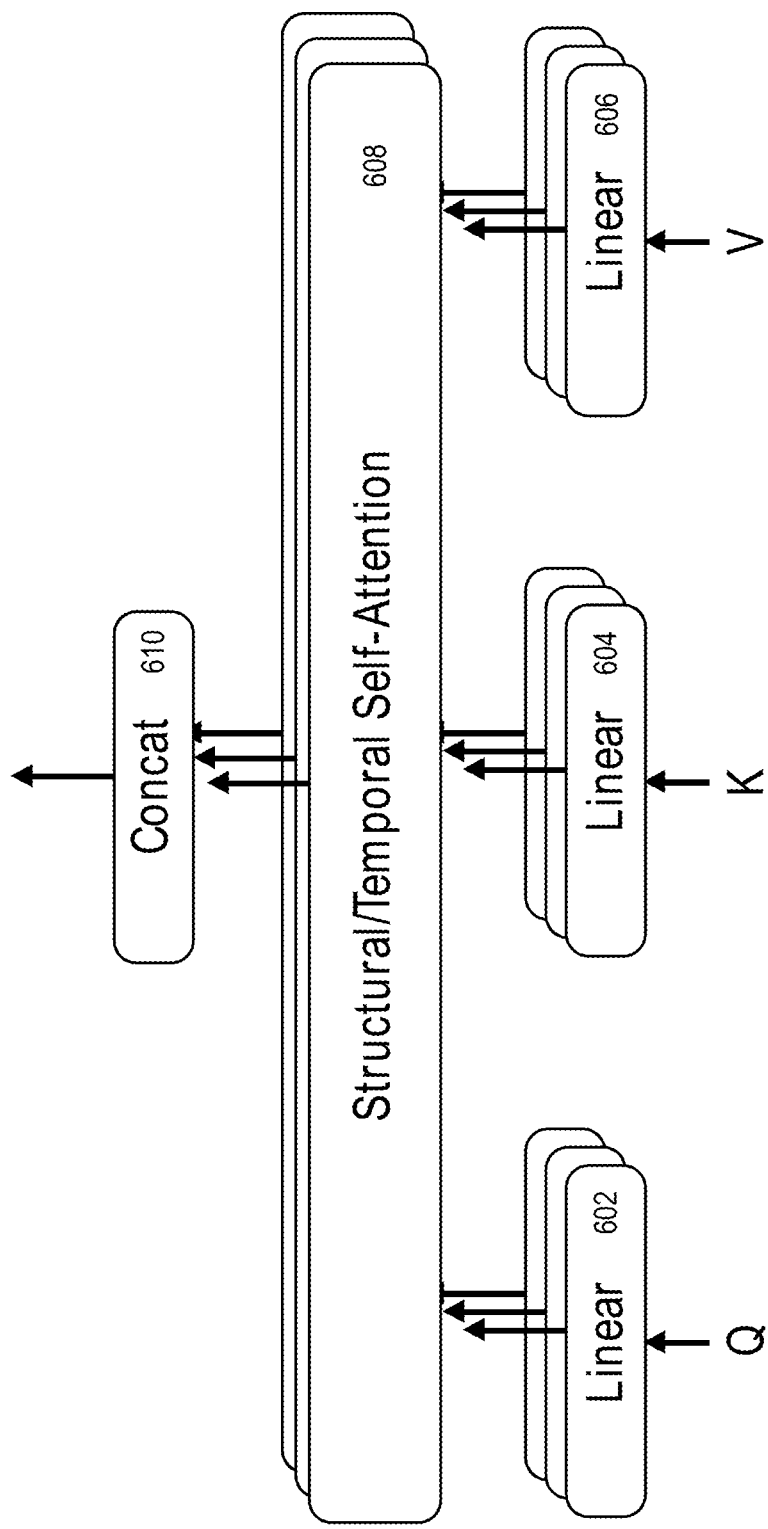
FIG. 6 shows a flow diagram illustrating a method of multi-head attention according to some embodiments.

FIG. 6 shows a flow diagram illustrating a method of multi-head attention according to some embodiments. A multi-head attention process can compute multiple attention weighted sums rather than a single attention pass over the values. To learn diverse representations, multi-head attention can apply different linear transformations to the values, keys, and queries for each head of attention. A single attention head can apply a unique linear transformation to its input queries, keys, and values (e.g., at step 602-606). Then at step 608, the attention score between each query and key can be computed and then used to weight the values and sum them. Then at step 610, The output of the attention process at step 608, can be concatenated for each head of attention that is performed.

Further details regarding FIG. 6 can be found in [Ashish Vaswani et al., In *Advances in Neural Information Processing Systems* 30: *Annual Conference on Neural Information Processing Systems* 2017, 4-9 Dec. 2017, Long Beach, CA, USA, pp. 6000-6010, 2017.], which is incorporated herein by reference for all purposes.

D. DySAT Architecture

The neural architecture according to embodiments, can use the above defined structural and temporal self-attention layers as modules. FIG. 7 shows a flow diagram illustrating a DySAT architecture according to some embodiments. As shown in FIG. 7, embodiments can have three modules from top to bottom, (1) a structural attention block (e.g., including 710-736), (2) a temporal attention block (e.g., including 740, 750, 752, 760, 762, 770, 772), and (3) graph context prediction (e.g., including 754, 764, and 774). The analysis computer can accept, as input, a collection of T graph snapshots, and can generate output latent node representations (e.g., intermediate vector representations) at each time step.

The structural attention block module can include multiple stacked structural self-attention layers to extract features from nodes at different distances. Each layer can be applied independently at different snapshots with shared parameters, as illustrated in FIG. 7, to capture local neighborhood structure around a node at each time-step (e.g., graph snapshot). However, the values input to a layer can potentially vary across different graph snapshots as the graph may change over time. The vector representations output by the structural attention block, can be denoted as $\{h_v^1, h_v^2, \ldots, h_v^T\}, h_v^t \in \mathbb{R}^f$, which can feed as input to the temporal attention block.

For example, FIG. 7 illustrates three graph snapshots, including a first graph snapshot 710, a second graph snapshot 720, and a third graph snapshot 730. The first graph snapshot 710 can be a portion of a dynamic graph at time 1. In some embodiments, time 1 can be a time range (e.g., Aug. 11, 2019 to Aug. 17, 2019). The second graph snapshot 720 can be a portion of the dynamic graph at time 2. The third graph snapshot 730 can be a portion of the dynamic graph at time T. The dynamic graph may include graph data which may be, for example, communication graph data. For example, each node of the first graph snapshot 710 can represent an email address of a user. The edges connecting the nodes in the first graph snapshot 710 can indicate a communication between the users of the two email addresses. In the first graph snapshot 710, the node V can be connected to the nodes 2 and 3 via edges. This may correspond to a situation in which the email address of node V received and/or emails from email addresses associated with nodes 2 and 3.

Over time, as indicated in subsequent graph snapshots, the structure of the dynamic graph may change. For example, new edges may be created when two email addresses communicate with one another when they previously did not communicate and new nodes may be created as new email addresses are created. Further, nodes and edges can be removed as email addresses are deactivated and when two email addresses cease to communicate.

Each node of each graph snapshot may be associated with one or more characteristics. For example, a node which indicates an email address of a user can have characteristics of a local-part, a domain, a character length, a sub-address, etc. For example, the characteristics of node 2 can be illustrated by characteristics 712 and can differ from the characteristics of node V. Similarly, the node V in the third graph snapshot 730 can have neighboring nodes 3 and 4, which may be taken into account when determining an intermediate vector representation for time T.

The dashed arrows (e.g., arrow 713) can indicate which nodes (e.g., neighboring nodes) can be taken into account when performing a self-attentional process on a given node. For example, the node V in the first graph snapshot 710 can have neighboring nodes 2 and 3, which may be taken into account when determining an intermediate vector representation for the node V.

The analysis computer can extract a plurality of first datasets from a plurality of graph snapshots using a structural self-attention module as described herein. The plurality of first datasets can include intermediate vector representations 714, 724, and 734 for each node for each snapshot of the plurality of graph snapshots (e.g., the first graph snapshot 710, the second graph snapshot 720, and the third graph snapshot 730). Each dataset of the plurality of first datasets can comprise a plurality of vectors. In some embodiments, the intermediate vector representations 714 can include any suitable number of vectors. In some embodiments, there may be one vector for each node of the corresponding graph snapshot.

For example, the analysis computer can determine first intermediate vector representations 714 (denoted as $h_v^1$) of the first graph snapshot 710. The first intermediate vector representations 714 can be determined by embedding the nodes of the first graph snapshot 710 using a self-attentional neural network. For example, the analysis computer can analyze the node V of the first graph snapshot 710. The analysis computer can determine a vector representative of the node V and neighboring nodes 2 and 3 using equation (1), above. In some embodiments, the vector can have fewer dimensions than the node V. For example, the node V and the neighboring nodes can be input into an embedding self-attentional neural network to determine an output (e.g., intermediate vector representations) which represents the structure of the node V and the surrounding neighbor nodes 2 and 3.

The analysis computer can determine intermediate vector representations corresponding to each graph snapshot separately. The analysis computer can determine intermediate vector representations for any suitable number of graph snapshots. For example, the analysis computer can determine intermediate vector representations from each graph snapshot that has been recorded and/or measured and then stored in a graph data database. In some embodiments, the analysis computer may have previously determined intermediate vector representations, in which case, the analysis computer can retrieve the intermediate vector representations from a database.

In some embodiments, after extracting the first intermediate vector representations 714 from the first graph snapshot 710, the analysis computer can apply positional embeddings to the intermediate vector representations in order to equip the intermediate vector representations with a sense of ordering. For example, the temporal attention module can be equipped with a sense of ordering through position embeddings (Gehring et al., 2017), $\{p^1, \ldots, p^T\}$, $p^t \in \mathbb{R}^f$, which can embed an absolute temporal position of each snapshot. The position embeddings can then be combined with the output of the structural attention block to obtain input representations: $\{h_v^1+p^1, h_v^2+p^2, \ldots, h_v^T+p^T\}$ for node v across multiple time steps. The input representations being input to the temporal attention block module 720.

Next, the temporal self-attention block module 740 will be discussed. This block also follows a similar structure, as the structural self-attention block, with multiple stacked temporal self-attention layers. The outputs of the final layer (e.g., a second dataset) pass into a position-wise feed-forward layer to give the final node representations $\{e_v^1, e_v^2, \ldots, e_v^T\}$ $\forall v \in V$. In FIG. 7, the feed forward layer 750 is shown separately from the temporal self-attention block module 740 for illustration. However, it is understood that the temporal self-attention block may comprise the feed forward layer (e.g., 750, 760, 770) and can be configured to determine the final node representations (e.g., 752, 762, 772, etc.).

For example, at step 740, the analysis computer can extract at least a second dataset from the plurality of first datasets using a temporal self-attention module across the plurality of graph snapshots. The second dataset can include, for example, final node representations for a graph comprising the plurality of graph snapshots. The final node representations can include any suitable number of vector representations of the nodes. In some embodiments, the final node representations can include a plurality of vectors equal to the number of nodes.

The analysis computer can, for example, input the first dataset (e.g., intermediate vector representations), determined from the previously performed structural self-attention neural networks, into second neural network which can determine embeddings for each input using a self-attention process. The first dataset may include determined intermediate vector representations from each previous and current graph snapshot. For example, at time T=2, the first dataset can include intermediate vector representations from the first graph snapshot 710 and the second graph snapshot 720. For example, a first intermediate vector representation, resulting from the node V in the first graph snapshot 710 can be input into the neural network along with the second intermediate vector representation, resulting from the node V in the second graph snapshot 720.

For the node V, the input can be, for example, $\{x_v^1, x_v^2\}$, where $x_v^1$ can be an intermediate vector representation of node V at graph snapshot 1 (e.g., 710), and where $x_v^2$ can be an intermediate vector representation of node V at graph snapshot 2 (e.g., 720). Although one node is discussed, it is understood that the analysis computer can determine an intermediate vector representation of each node of each graph snapshot. This input representation of node V can constitute an encoding of the local structure around the node V. The values of $x_v^t$ can be the query in the self-attention process, and can be used to attend over the node V's historical representations, thus tracing the evolution of the values of $x_v^t$ over time.

For example, between the first graph snapshot 710 and the second graph snapshot 720, the node V representing an email address in a communication network can begin communicating with new email address represented by node 4. Since the analysis computer determined an intermediate vector representation representing the node V's local structure, the changes in the local structure over time can be analyzed.

The temporal self-attention block module 740 can determine, via a self-attentional process, weights indicative of how much a portion of a given input relates to the rest of the input. For example, the analysis computer can determine weights indicative of how much a first intermediate vector representation of a first node relates to a plurality of other intermediate vector representations of the first node.

For example, a first node representative of a first email address can correspond to three determined intermediate vector representations. Each intermediate vector representation indicative of a local structure of the graph data surrounding the first node. For example, a first intermediate vector representation can indicate the structure around first node during a first week. The second and third intermediate vector representations can indicate the structure around the first node during subsequent weeks. The analysis computer can determine weights indicative of the similarity of input value (e.g., a first intermediate vector representation) to the rest of the input (e.g., the second and third intermediate vector representations). For example, the first week may have a similar local structure as the third week, whereas during the second week, the user associated with the first email address may have gone on vacation and did not check their email. The analysis computer can determine that the first week has a higher weight value in relation to the third week than the second week, which may be due to the vacation in the second week.

As an additional example, a first node representative of a resource provider can correspond to five determined intermediate vector representations. Each intermediate vector representation indicative of a local structure of the graph data surrounding the first node. For example, a first intermediate vector representation can indicate the structure around first node during the summer (e.g., the time of the graph snapshot is during the summer). Second, third, fourth, and fifth intermediate vector representations can indicate the structure around the first node during fall, winter, spring, and summer. The analysis computer can determine weights indicative of the similarity of input value (e.g., a first intermediate vector representation) to the rest of the input (e.g., second, third, fourth, and fifth intermediate vector representations). In this example, the analysis computer can determine a larger weight between the first and fifth intermediate vector representations due to similar local structures around the first node during the summer. For example, the resource provider represented by the first node may transact with a similar number and group of users during the summer, whereas the local structure may decrease (or change in any suitable manner) during the fall, winter, and spring.

At step 750, the analysis computer can determine final node representations 752 (e.g., $e_v^1$) based on the weights determined by a self-attentional neural network. The final node representations can be determined, for example, using a feed forward neural network. The final node representations 752 can be determined when the analysis computer determines intermediate vector representations for the first graph snapshot 710. The final node representations 762 can be determined when the analysis computer determines intermediate vector representations for the first graph snapshot 710 and the second graph snapshot 720. The final node representations 772 can be determined when the analysis computer determines intermediate vector representations for the first graph snapshot 710, the second graph snapshot 720, and the third graph snapshot 730.

In some embodiments, the feed forward layer 750 can be a position-wise feed forward layer. The analysis computer can determine the final node representations as output of the feed forward layer 750. In some embodiments, the feed forward layer 750 may be similar to the feed forward layer 760 and the feed forward layer 770.

The final node representations $e_v^t$ can be vectors which represent the changes in the node's local structure over time. For example, a final node representation corresponding to the node V can include a vector which indicates the addition of communications with node 4 at the second graph snapshot 720 and the removal of node 2 at the third graph snapshot 730. In some embodiments, the analysis computer can determine a plurality of final node representations, each final node representation corresponding to node of the graph data. This vector can then be used in any suitable local graph context prediction process. For example, in some embodiments, the analysis computer can train a neural network, SVM, etc. using the final node representations. The analysis computer can train a machine learning model as known to one of skill in the art.

Next, graph context prediction will be discussed. In some embodiments, to ensure that the learned representations capture both structural and temporal information, embodiments can define an objective function that preserves the local structure around a node, across multiple time-steps.

Embodiments can use the dynamic representations of a node v at time-step t (e.g., $e_v^t$) to predict the occurrence of nodes appearing the local neighborhood around a node v at a time t. For example, in some embodiments, the analysis computer can use a binary cross-entropy loss function at each time-step to encourage nodes, co-occurring in fixed-length random walks, to have similar vector representations. For example, as given by:

$$L_v = \sum_{t=1}^{T} \sum_{u \in N_{rw}^t(v)} -\log(\sigma(<e_u^t, e_v^t>)) - Q \cdot \Sigma_{v_n \in P_n^t(v)} \log(1 - \sigma(<e_{v_n}^t, e_v^t>)) \quad (5)$$

In equation (5), above, $\sigma$ can be a sigmoid function, $\mathcal{N}_{rw}^t(v)$ can be a set of nodes that co-occur with a node v on a fixed-length random walk at a graph snapshot at time t. $p_n^t$ can be a negative sampling distribution for the graph snapshot $\mathcal{G}^t$, and Q can be a negative sampling ratio. The negative sampling ration can be a tunable hyper-parameter to balance positive and negative samples.

At step 754, the analysis computer can determine a prediction regarding one or more nodes at a future time (e.g., in a future graph snapshot). For example, the analysis computer can determine whether or not two nodes will be connected to one another via an edge based on a model trained on the final node representations $e_v^t$.

For example, the model can include any suitable machine learning model. The analysis computer can perform any suitable prediction based on the context of the graph data. For example, analysis computer can use a trained neural network, trained on the final node representations, to perform graph context prediction. For example, the second dataset may correspond to graph data comprising nodes representative of email address. The graph data can include three graph snapshots, each graph snapshot including email interaction data during a week. Final node representations of the first node (e.g., the first email address) can represent an evolution in graph structure over time, the evolution including the user of the first email address going on vacation in the second week of the graph snapshots, as described above. The analysis computer can then determine a prediction regarding the first email address. For example, the analysis computer can determine whether or not the first email address will communicate with (e.g., be connected to) a second email address in the fourth week (e.g., fourth graph snapshot). In this example, the analysis computer can predict that the first email address will be connected to the second email address in the fourth graph snapshot due to the connections between the first and second email addresses in previous graph snapshots, as well as a low probability that the user of the first email address goes on vacation again (e.g., the first email address is not connected to other email addresses in the fourth graph snapshot).

E. Example Method

Figure 8:
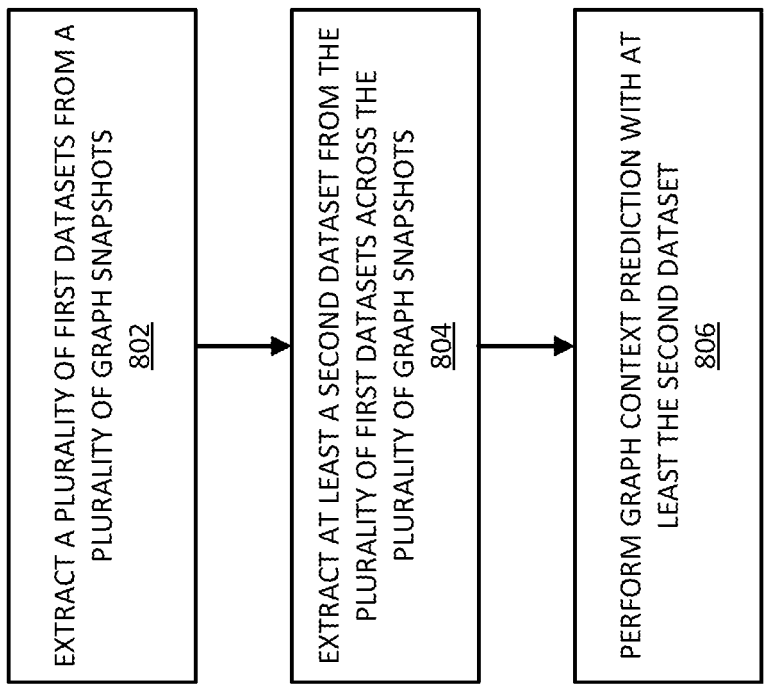
FIG. 8 shows a flow diagram illustrating a dynamic graph representation learning process according to some embodiments.

FIG. 8 shows a flow diagram illustrating a dynamic graph representation learning process according to some embodiments. The method illustrated in FIG. 8 will be described in the context of an analysis computer analyzing communication graph data. It is understood, however, that the invention can be applied to other circumstances (e.g., analyzing other types of graph data, etc.). In some embodiments, each graph snapshot of the plurality of graph snapshots can comprise a plurality of nodes. Each graph snapshot of the plurality of graph snapshots can include graph data associated with a timestamp.

At step 802, the analysis computer can extract a plurality of first datasets from a plurality of graph snapshots using a structural self-attention module. The plurality of first datasets can include intermediate vector representations for each node for each snapshot of the plurality of graph snapshots. In some embodiments, extracting the plurality of first datasets may also include, for each graph snapshot of the plurality of graph snapshots, determining the intermediate vector representation for each node based on learned coefficients and the intermediate vector representations corresponding to neighboring nodes.

At step 804, the analysis computer can extract at least a second dataset from the plurality of first datasets using a temporal self-attention module across the plurality of graph snapshots. The second dataset can include final node representations for a graph comprising the plurality of graph snapshots. In some embodiments, extracting at least the second dataset can further include determining the final node representations for each node based on weights and intermediate vector representations corresponding to neighboring nodes. In some embodiments, the intermediate vector representations and the final node representations can be embeddings of each node in a vector space representative of characteristics of the plurality of nodes.

At step 806, the analysis computer can perform graph context prediction with at least the second dataset. For example, the analysis computer can train a machine learning model using at least the second dataset. Then the analysis computer can determine a prediction using the machine learning model. The prediction can then be used by the analysis computer to perform additional processing such as, but not limited to, performing an action based on the prediction, transmitting a prediction message to another device, determining whether or not a probability value associated with the prediction (determined by the machine learning model) exceeds a predetermined probability threshold, and/or any other suitable processing of the prediction.

IV. Experiments

The quality of the learned node representations on the fundamental task of dynamic link prediction can be evaluated. A dynamic link prediction task is chosen as an evaluation since it tests the ability of the representations in predicting the temporal evolution in graph structure.

In the experiments, the performance of DySAT is compared against a variety of static and dynamic graph representation learning baselines, on four publicly available benchmark datasets, achieving state-of-the-art performance across all of them. This section summarizes the experimental setup, results and a temporal stability analysis of model performance.

Experiments can be conducted on single-step and multi-step link prediction (or forecasting). The single-step setting uses the latest embeddings at time step t to predict the links at t+1. A downstream logistic regression classifier can be used by creating evaluation examples from the links in $\mathcal{G}^{t+1}$ and an equal number of randomly sampled pairs of non-links. In the multi-step scenario, the embeddings can predict links at multiple future time steps $\{t+1, \ldots, t+\Delta\}$. In each dataset, the latest $\Delta=6$ snapshots are chosen for evaluation. AUC (area under the curve) scores can be used to evaluate link prediction.

A. Datasets

Four dynamic graph datasets with two communication networks and two bipartite rating networks are used in the evaluation of embodiments.

The two communication networks datasets can include: Enron (Klimt & Yang, 2004) and UCI (Panzarasa et al., 2009). In Enron, the communication links are between employees over the span of four years, while the links in UCI represent private messages sent between users over six months, on an online social network at the University of California, Irvine.

The two rating network datasets can be two bipartite rating networks from Yelp and MovieLens (Harper & Konstan, 2016). In Yelp, the dynamic graph comprises links between two types of nodes, users and businesses derived from the observed ratings over time. ML-10M consists of a user-tag interaction network depicting the tagging behavior of MovieLens users, where a user-tag link connects a user with a tag she applied on a movie.

In each dataset, multiple snapshots are created based on the observed communications/ratings within fixed-length time windows. Table 1 illustrates the statistics of the different datasets.

TABLE 1

Dataset statistics

| Dataset | Enron | UCI | Yelp | ML-10M |
|---|---|---|---|---|
| # Nodes | 143 | 1,809 | 6,569 | 20,537 |
| # Links | 2,347 | 16,822 | 95,361 | 43,760 |
| # Time-steps | 10 | 13 | 16 | 13 |

B. Experimental Setup

Experiments are conducted on the task of dynamic link prediction, where embodiments learn dynamic node representations on snapshots $\{\mathcal{G}^1, \ldots, \mathcal{G}^t\}$ and use $\{e_v^t, \forall v \in \mathcal{V}\}$ to predict the links at $\mathcal{G}^{t+1}$. Different models are compared based on their ability to correctly classify each example (pair of nodes) into links and non-links.

Training sets, validation sets, and test sets are created from the links in $\mathcal{G}^{t+1}$ and an equal number of randomly sampled pairs of unconnected nodes (non-links). The training set contains 20% of the examples, while the validation and test sets contain 20% and 60% of examples, respectively. The number of examples used in each dataset, are provided in Table 1.

In this experiment, embodiments of the disclosure are implemented in Tensorflow (Abadi et al., 2016) and employ mini-batch gradient descent with Adam optimizer (Kingma & Ba, 2015) for training. The structural and temporal blocks, each consist of a single self-attentional layer with H=16 attention heads computing D=8 features each (for a total of 128 dimensions). Embodiments in the experiment use a LeakyRELU non-linearity to compute the attention weights, followed by an ELU activation in each layer. During training, $L_2$ regularization can be applied with $\lambda=0.0005$ and use dropout (Srivastava et al., 2014) in the self-attention layers of both the structural and temporal blocks. Embodiments use the validation set for hyper-parameter optimization (dropout rate for all layers and negative sampling ratio Q). The model is trained for a maximum of 200 epochs and the best performing model on the validation set, is chosen for evaluation.

C. Baselines

The performance of embodiments (e.g., DySAT) is compared with several state-of-the-art static and dynamic graph embedding techniques. Static embedding methods are trained on the aggregate graph up to time t, where the weight of a link can be defined as the cumulative weight until t (e.g., link weights are aggregated agnostic of the occurrence time). Author-provided implementations for all the baselines are used, and as such the final embedding dimension can be set as d=128.

Embodiments are compared against two state-of-the-art unsupervised static embedding methods, node2vec (Grover & Leskovec, 2016) and GraphSAGE (Hamilton et al., 2017). For node2vec, the default settings as in the paper are used, with 10 random walks of length 80 per node and context window of 10, trained for a single epoch. All variants of GraphSAGE are trained using two layers with neighborhood sample sizes 25 and 10 for 10 epochs, as described in the original paper, and the scores of the best performing model are reported. In addition, a graph attention layer (GAT) is implemented within the framework of GraphSAGE, denoted by GraphSAGE+GAT, to provide a fair comparison with GAT (Velickovic et al., 2018) (which has been designed for node classification).

In the dynamic setting, DySAT is evaluated against Know-Evolve (Trivedi et al., 2017), an RNN-based method designed for multi-relational knowledge graphs and state-of-the-art dynamic graph embedding technique Dynamic-Triad (Zhou et al., 2018). For DynamicTriad (Zhou et al., 2018), the two hyper-parameters $\beta_0$ and $\beta_1$ are tuned to determine the effect of smoothness and triadic closure, in the range of $\{0.01, 0.1, 1, 10\}$, as recommended, while using standard settings otherwise.

The performance of different models can be evaluated by training a logistic regression classifier for dynamic link prediction. The strategy recommended by Grover & Leskovec (2016) is followed to compute the feature representation for a pair of nodes, using the Hadamard Operator ($e_u^t \odot e_v^t$), for almost all methods unless explicitly specified otherwise. The Hadamard operator computes the element-wise product of two vectors and closely mirrors the widely used inner product operation in most embedding methods. For DynamicTriad, the $L_1$ operator ($|e_u^t - e_v^t|$) is used, which gives better performance, as recommended in the paper. Two standard metrics are used for evaluating link prediction: 1) area under the ROC curve (AUC) and 2) average precision (AP) scores on the test set.

D. Experimental Results

Single-Step Link Prediction: the methods are evaluated at each time step t by training separate models up to graph snapshot t for each t=1, ..., T. As shown in Table 2, DySAT achieves consistent gains of 4-5% macro-AUC, in comparison to the best baseline across all datasets. DynAERNN typically comes second-best, validating the effectiveness of RNN-based methods. The performance comparison of different graph embedding methods yields several interesting insights.

First, GraphSAGE performs comparably with dynamic baselines despite being trained on static graphs. One possible reason is that GraphSAGE uses trainable neighbor-aggregation, while the dynamic methods either employ Skip-gram or adjacency reconstruction techniques to model structural proximity. This affirms the superior performance of DySAT which uses aggregations and multi-head attentions for joint structural and temporal modeling. Second, node2vec achieves consistent performance while being trained agnostic to temporal graph evolution. This points to further gains on applying second-order random walk sampling techniques to DySAT.

Models are also compared at each time step (FIGS. 9-12) to obtain a deep understanding of their temporal behaviors. DySAT achieves a more stable performance especially in the communication data of the Enron dataset and the UCI dataset, compared with static methods that encounter drastic performance drops at certain time steps.

Multi-Step Link Prediction: results of different graph embedding methods on multi-step link prediction are presented. FIGS. 13-16 depict the performance variation over 6 future snapshots, indicating a slight decay over time for all models. DySAT achieves significant gains over the baselines, especially in later time steps. Static methods often exhibit large variations over time, while DySAT maintains a stable and consistently high performance. This demonstrates the capability of temporal attention in DySAT, to capture the most relevant historical context for forecasting.

FIGS. 9-16 show performance comparisons of different methods across multiple time-steps for the four datasets. In FIGS. 9-16 the communication dataset 1 can be the Enron dataset, the communication dataset 2 can be the UCI dataset, the ratings dataset 1 can be the Yelp dataset, and the ratings dataset 2 can be the ML-10M dataset.

Figure 9:
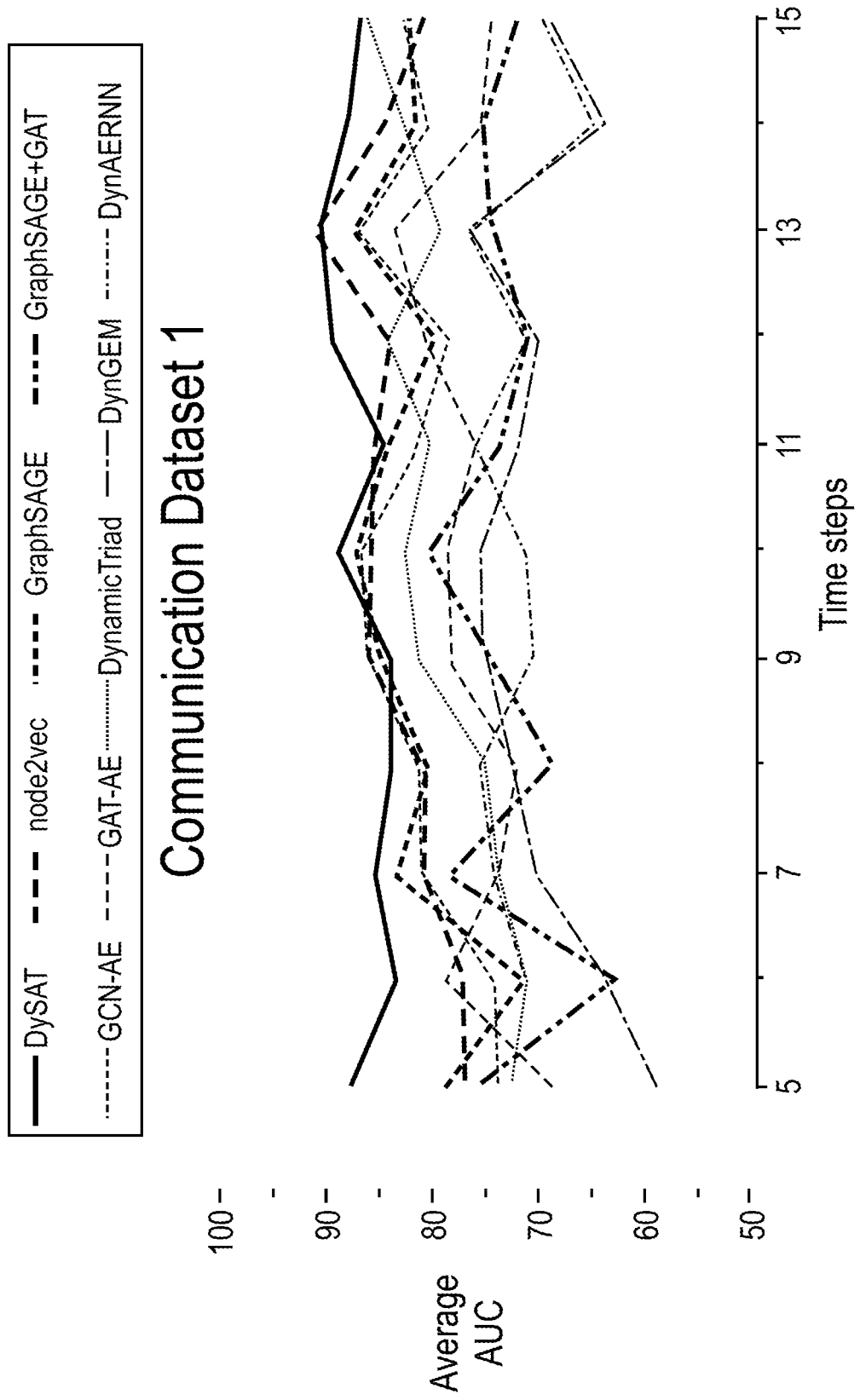
FIG. 9 shows a performance comparison against a first benchmark dataset according to some embodiments.
Figure 10:
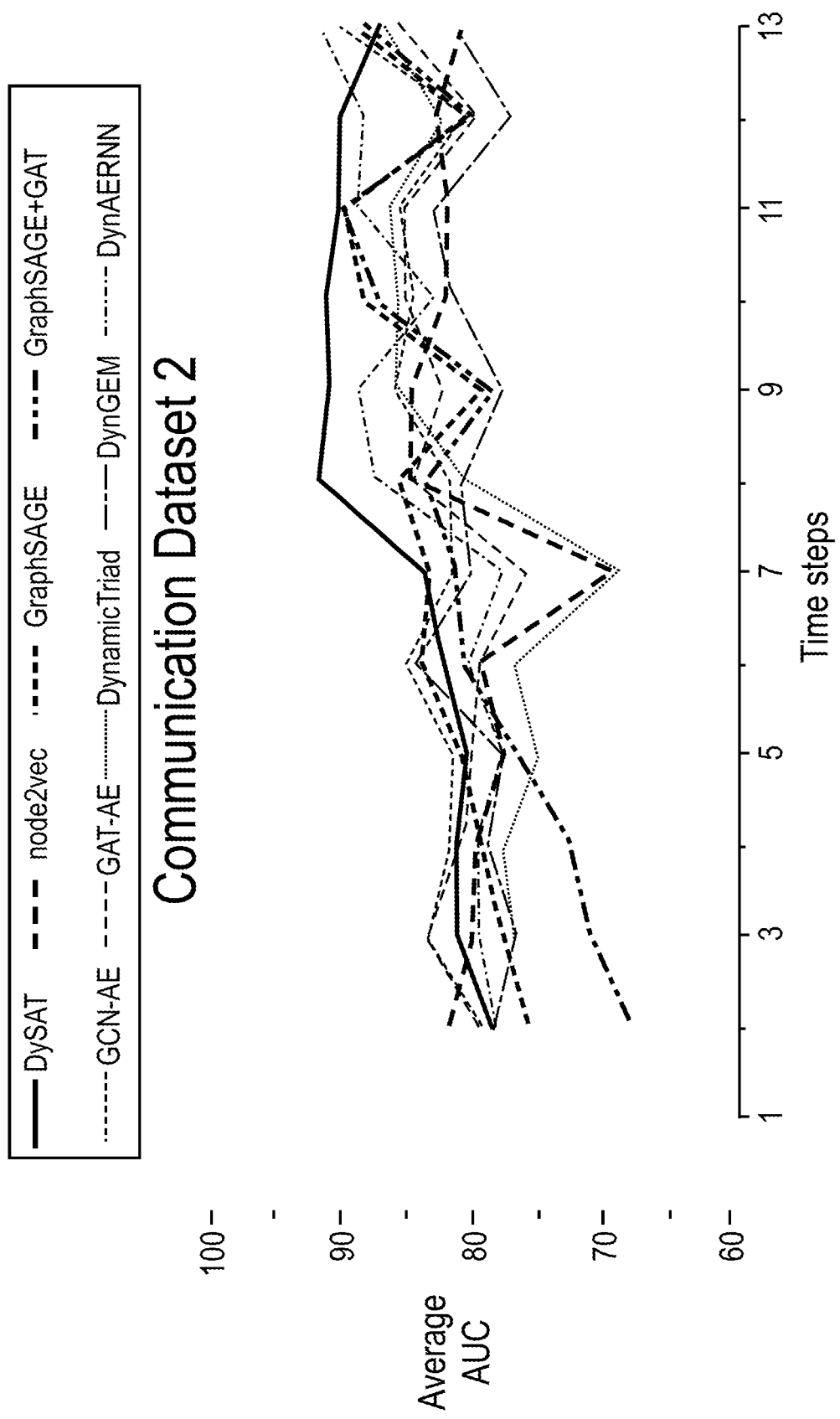
FIG. 10 shows a performance comparison against a second benchmark dataset according to some embodiments.
Figure 11:
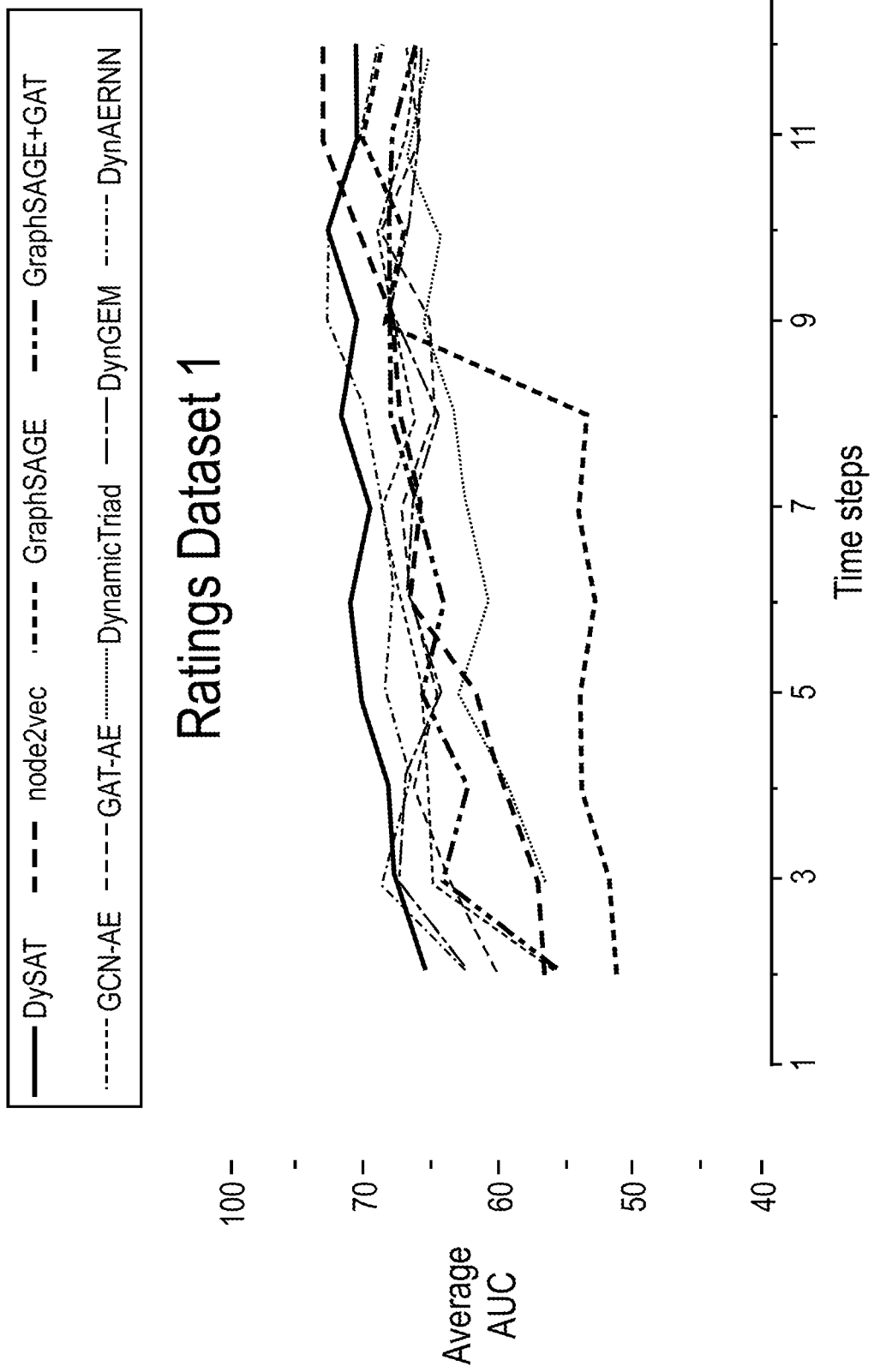
FIG. 11 shows a performance comparison against a third benchmark dataset according to some embodiments.
Figure 12:
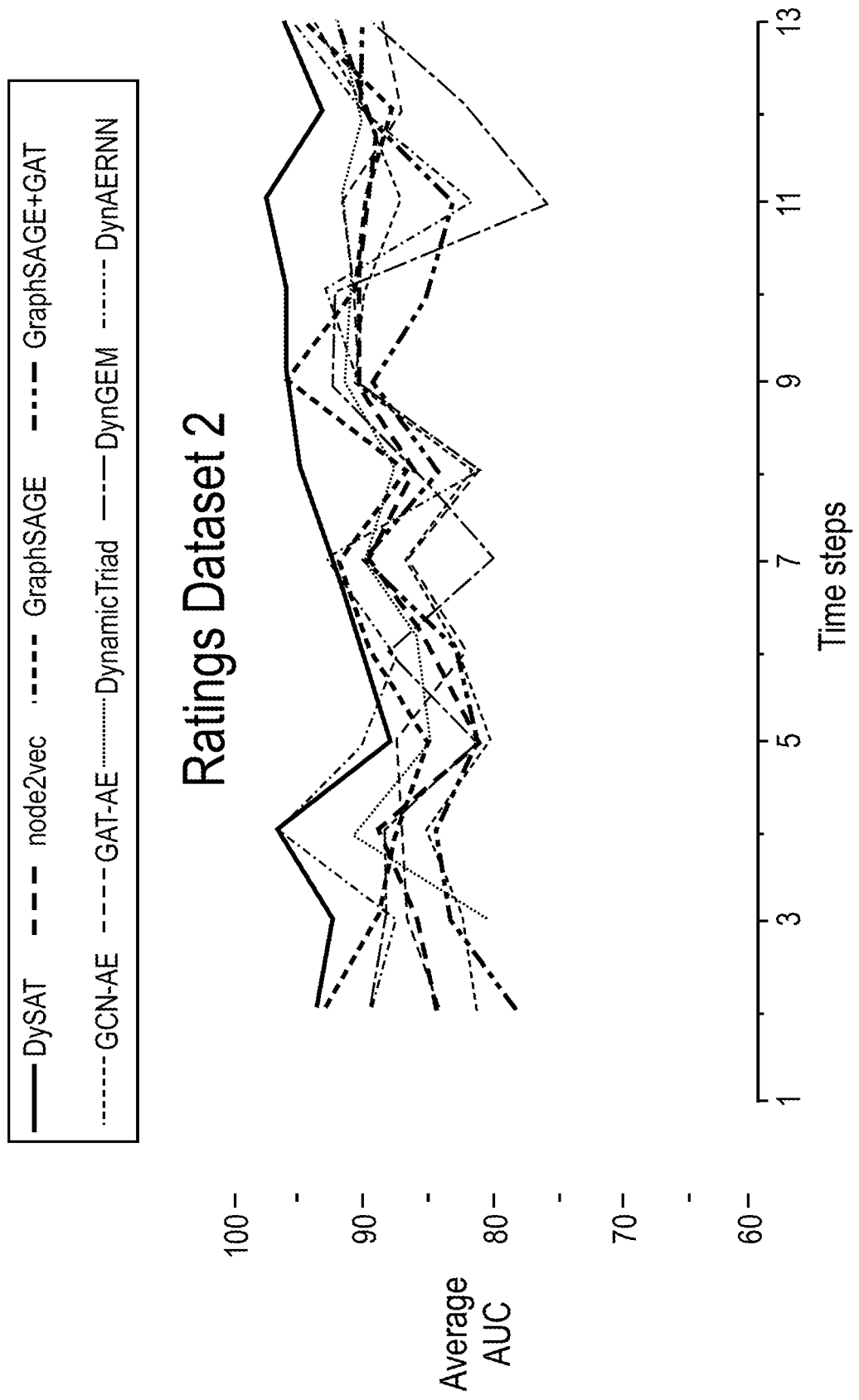
FIG. 12 shows a performance comparison against a fourth benchmark dataset according to some embodiments.

FIGS. 9-12 illustrate a performance comparison of embodiments on single-step link prediction. FIG. 9 shows a performance comparison against a first benchmark dataset according to some embodiments. FIG. 10 shows a performance comparison against a second benchmark dataset according to some embodiments. FIG. 11 shows a performance comparison against a third benchmark dataset according to some embodiments. FIG. 12 shows a performance comparison against a fourth benchmark dataset according to some embodiments.

Figure 13:
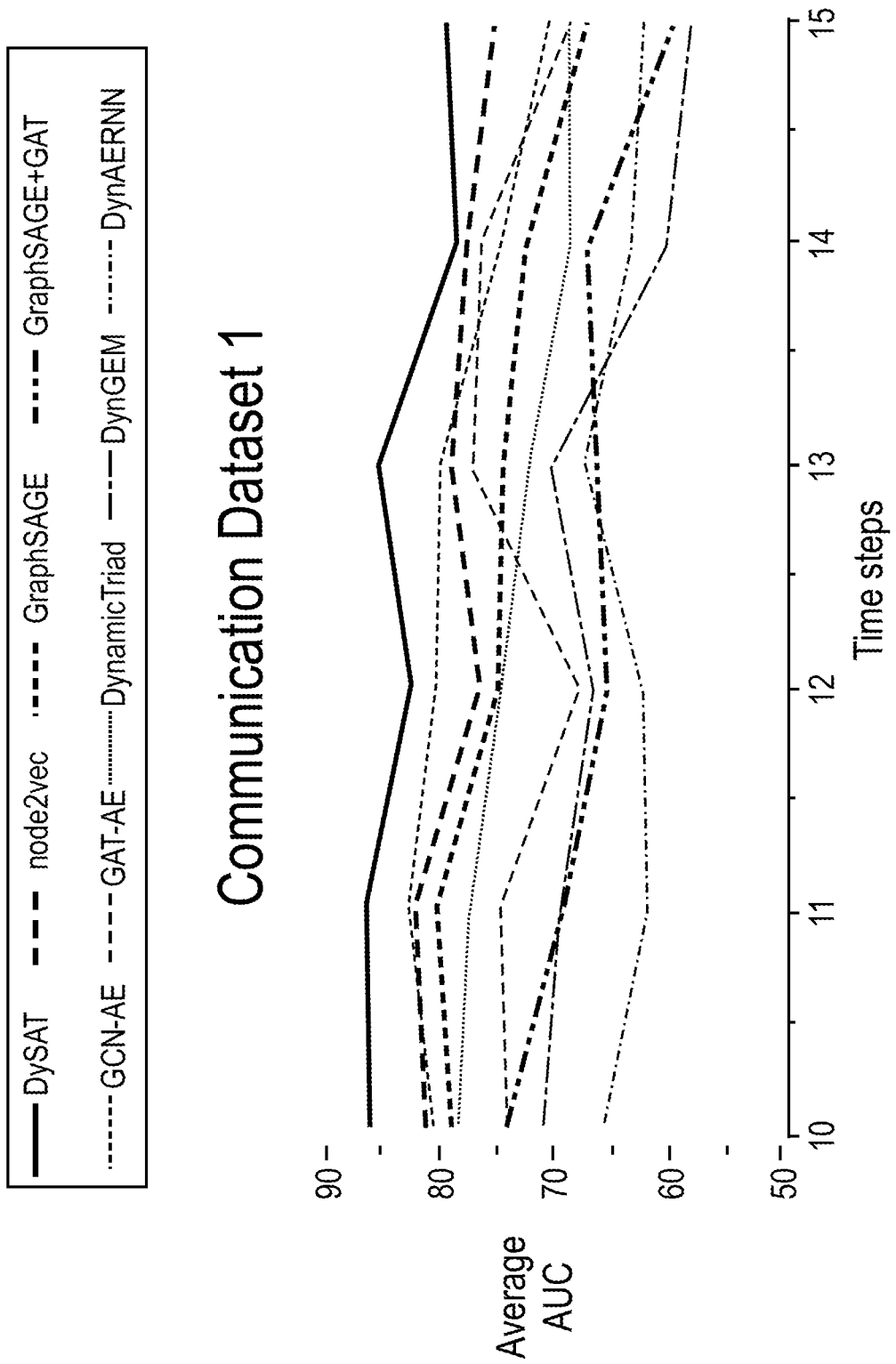
FIG. 13 shows a performance comparison against a first benchmark dataset on multi-step link prediction for the next 6 time steps according to some embodiments.
Figure 14:
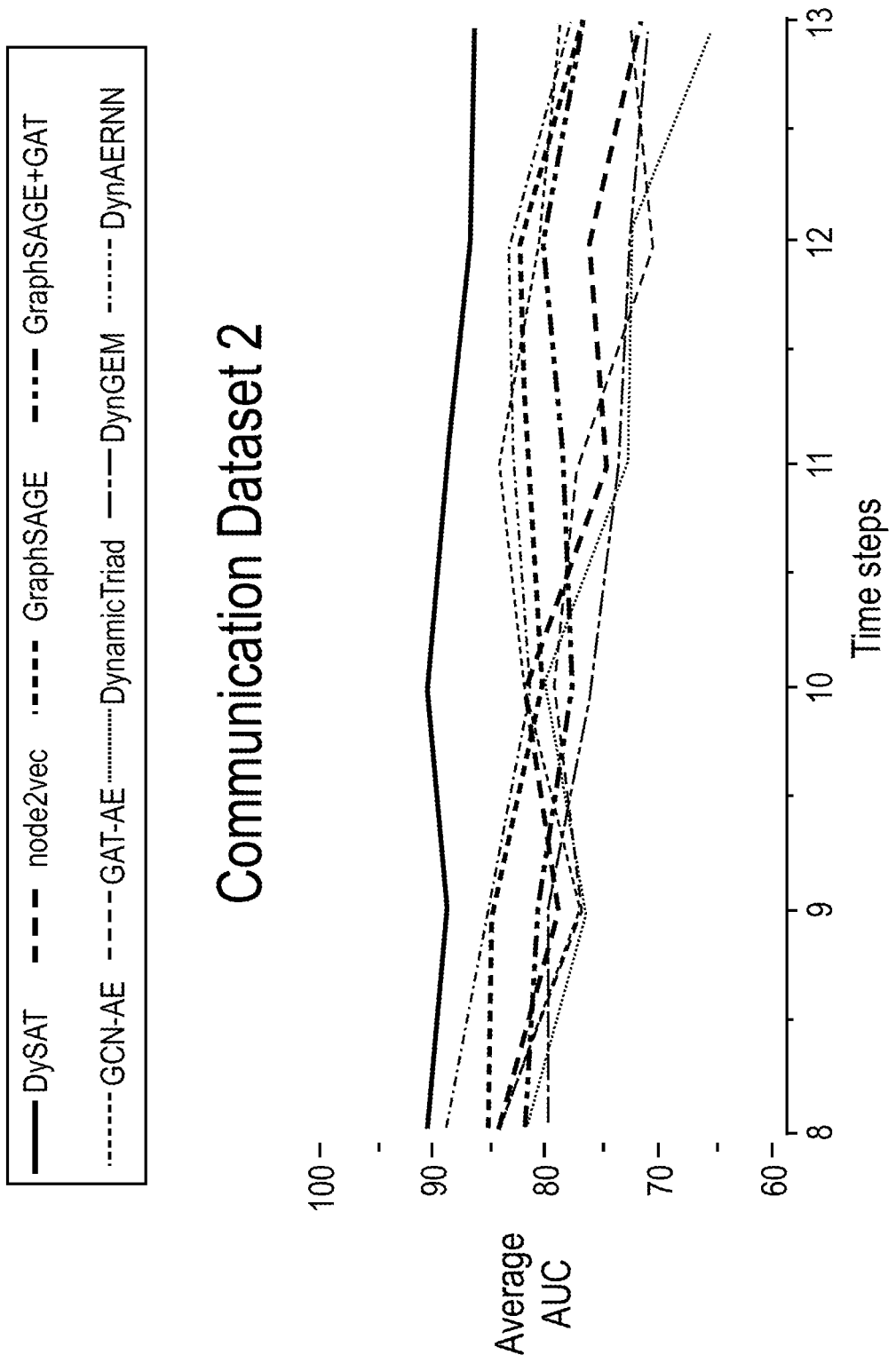
FIG. 14 shows a performance comparison against a second benchmark dataset on multi-step link prediction for the next 6 time steps according to some embodiments.
Figure 15:
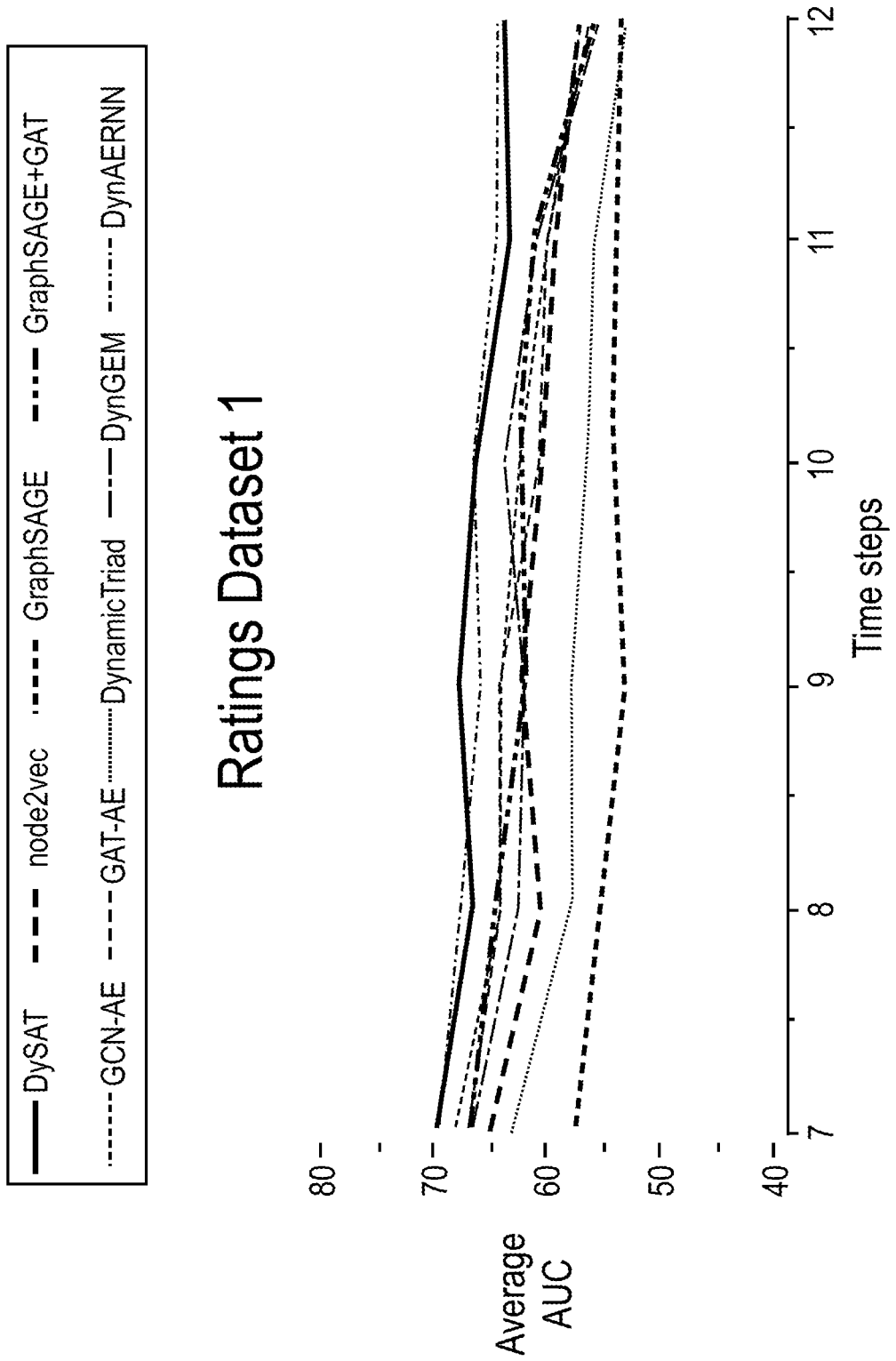
FIG. 15 shows a performance comparison against a third benchmark dataset on multi-step link prediction for the next 6 time steps according to some embodiments.
Figure 16:
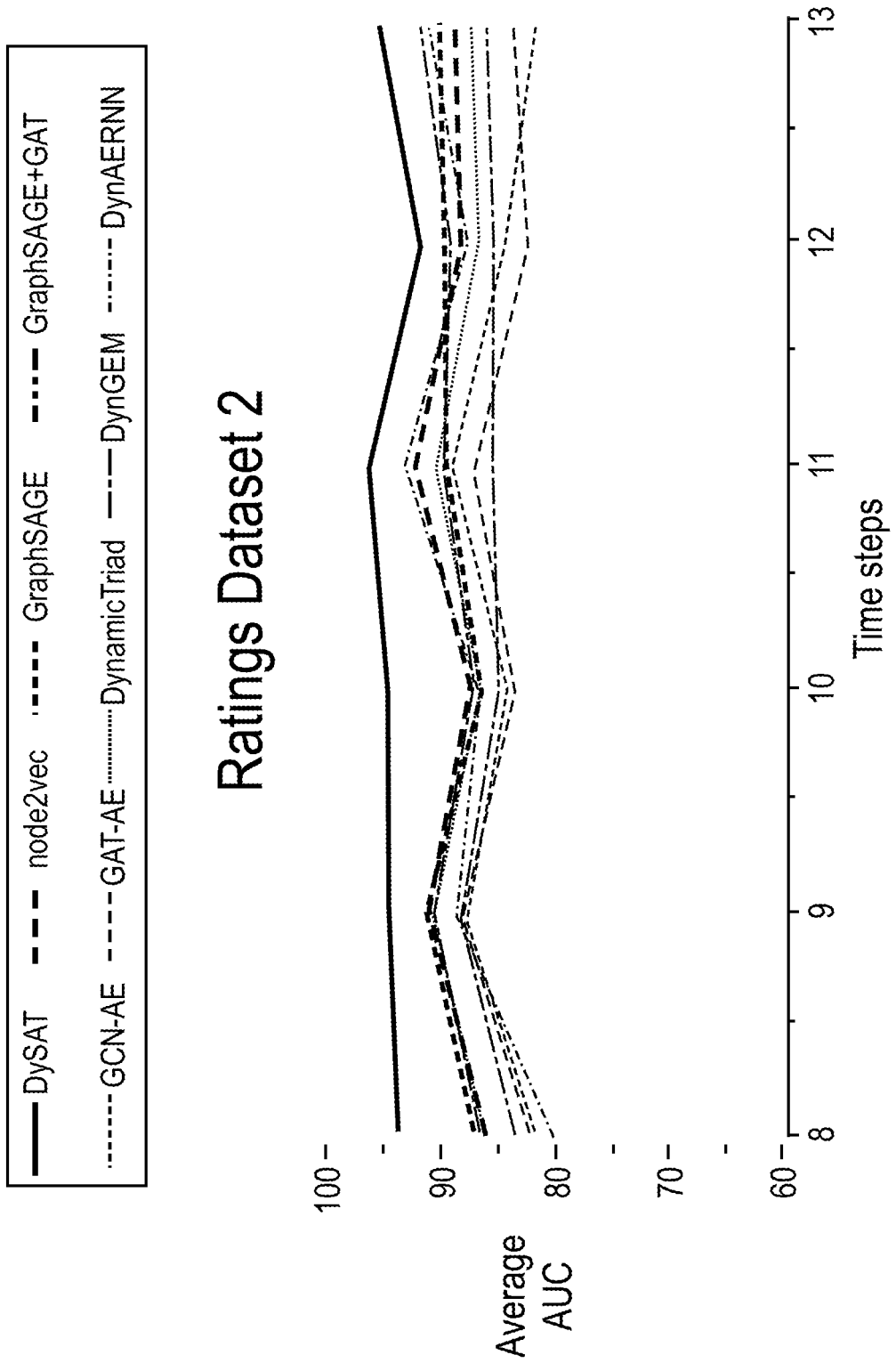
FIG. 16 shows a performance comparison against a fourth benchmark dataset on multi-step link prediction for the next 6 time steps according to some embodiments.

FIGS. 13-16 illustrate a performance comparison of embodiments on multi-step link prediction for the next 6 time steps. FIG. 13 shows a performance comparison against a first benchmark dataset according to some embodiments. FIG. 14 shows a performance comparison against a second benchmark dataset according to some embodiments. FIG. 15 shows a performance comparison against a third benchmark dataset according to some embodiments. FIG. 16 shows a performance comparison against a fourth benchmark dataset according to some embodiments.

Further, all models are compared at each time-step to analyze the relative stability and variance in model performance over time. The performance of embodiments is observed to be relatively more stable than other dynamic embedding methods and significantly superior to static embedding techniques.

TABLE 2

Single-step link prediction (micro and macro AUC with std. dev), illustrating GraphSAGE (G-SAGE) with the best aggregators (*, †, and ‡ denote GCN, LSTM, and max-pool respectively).

| Method | Enron | | UCI | | Yelp | | ML-10M | |
|---|---|---|---|---|---|---|---|---|
| | Micro-AUC | Macro-AUC | Micro-AUC | Macro-AUC | Micro-AUC | Macro-AUC | Micro-AUC | Macro-AUC |
| node2vec | 83.72 ± 0.7 | 83.05 ± 1.2 | 79.99 ± 0.4 | 80.49 ± 0.6 | 67.86 ± .02 | 65.34 ± 0.2 | 87.74 ± 0.2 | 87.52 ± 0.3 |
| G-SAGE | 82.48* ± 0.6 | 81.88* ± 0.5 | 79.15* ± 0.4 | 82.89* ± 0.2 | 60.95† ± 0.1 | 58.56† ± 0.2 | 86.19‡ ± 0.3 | 89.92‡ ± 0.1 |
| G-SAGE + GAT | 72.52 ± 0.4 | 73.34 ± 0.6 | 74.03 ± 0.4 | 79.83 ± 0.2 | 66.15 ± 0.1 | 65.09 ± 0.2 | 83.97 ± 0.3 | 84.93 ± .01 |
| GCN-AE | 81.55 ± 1.5 | 81.71 ± 1.5 | 80.53 ± 0.3 | 83.50 ± 0.5 | 66.71 ± 0.2 | 65.82 ± 0.2 | 85.49 ± 0.1 | 85.74 ± 0.1 |
| GAT-AE | 75.71 ± 1.1 | 75.97 ± 1.4 | 79.98 ± 0.2 | 81.86 ± 0.3 | 65.92 ± 0.1 | 65.37 ± .01 | 87.01 ± 0.2 | 86.75 ± 0.2 |
| DynamicTriad | 80.26 ± 0.8 | 78.98 ± 0.9 | 77.59 ± 0.6 | 80.28 ± 0.5 | 63.53 ± 0.3 | 62.69 ± 0.3 | 88.71 ± 0.2 | 88.43 ± 0.1 |
| DynGEM | 67.83 ± 0.6 | 69.72 ± 1.3 | 77.49 ± 0.3 | 79.82 ± 0.5 | 66.02 ± 0.2 | 65.94 ± 0.2 | 73.69 ± 1.2 | 85.96 ± 0.3 |
| DynAERNN | 72.02 ± 0.7 | 72.01 ± 0.7 | 79.95 ± 0.4 | 83.52 ± 0.4 | 69.54 ± 0.2 | 68.91 ± 0.2 | 87.73 ± 0.2 | 89.47 ± 0.1 |
| DySAT (Embodiments) | 85.71 ± 0.3 | 86.60 ± 0.2 | 81.03 ± 0.2 | 85.81 ± 0.1 | 70.15 ± 0.1 | 69.87 ± 0.1 | 90.82 ± 0.3 | 93.68 ± 0.1 |

V. Conclusion

It is observed that embodiments outperform the baselines by a significant margin. It is also found that GraphSAGE often achieves similar or better performance than DynamicTriad across different datasets. GraphSAGE operates on static graphs using trainable neighbor-aggregation functions, while DynamicTriad employs Skip-gram based methods augmented with temporal smoothness. In contrast, embodiments can include both the structural and the temporal layers with expressive aggregation functions (such as multi-head attention) which can result in a consistently superior performance of DySAT on dynamic link prediction.

In DySAT, the temporal attention layers are stacked on top of structural attention layers. This design is beneficial since graph structures may not be stable over time, which makes the inverse option (e.g., temporal attention layers then structural attention layers) perform poorly in comparison.

Another way that the attention layers can be structured is by applying self-attention along the two dimensions of neighbors and time together following a strategy similar to DiSAN (Shen et al., 2018). However, this would be computationally expensive due to a variable number of neighbors per node across multiple snapshots.

Further, embodiments can be directly extended to learn incremental embeddings in a streaming environment, enabling both computational and memory efficiency.

Embodiments of the disclosure provide for a novel self-attentional neural network architecture for node representation learning on dynamic graphs. DySAT can computes dynamic node representations using self-attention over the (a) structural neighborhood and (b) historical node representations, thus effectively capturing the temporal evolution of graph structure.

Embodiments of the disclosure provide for a number of advantages. For example, experimental results on a number of real-world dynamic graph datasets indicate a significant margin of gains over several recently proposed methods. The evaluation results show that embodiments of the disclosure achieve significant improvements (5% on average) over several state-of-the-art baselines and maintains a more stable performance over different time steps. While the experiments were designed on graphs without node features, methods according to embodiments of the disclosure can be easily generalized to feature-rich graphs.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

VI. References

Martin Abadi, In 12*th USENIX Symposium on Operating Systems Design and Implementation*, OSDI 2016, Savannah, G., USA, Nov. 2-4, 2016., pp. 265-283, 2016.

Dzmitry Bandanau, Kyunghyun Cho, and Yoshua Bengio, In *International Conference on Learning Representations* (ICLR), 2015.

Mikhail Belkin and Partha Niyogi, In *Advances in Neural Information Processing Systems* 14 [*Neural Information Processing Systems: Natural and Synthetic*, NIPS 2001, Dec. 3-8, 2001, Vancouver, British Columbia, Canada], pp. 585-591,2001.

Michael Defferrard, Xavier Bresson, and Pierre Vandergheynst, In *Advances in Neural Information Processing Systems* 29: *Annual Conference on Neural Information Processing Systems* 2016, Dec. 5-10, 2016, Barcelona, Spain, pp. 3837-3845, 2016.

Jonas Gehring et al., *Convolutional sequence to sequence learning*. In *Proceedings of the* 34*th International Conference on Machine Learning*, ICML 2017, Sydney, NSW, Australia, 6-11 Aug. 2017, pp. 1243-1252,2017.

Palash Goyal et al., In *IJCAI International Workshop on Representation Learning for Graphs* (ReLiG), August 2017.

Aditya Grover and Jure Leskovec. node2vec: In *Proceedings of the* 22*nd ACM SIGKDD International Conference on Knowledge Discovery and Data Mining*, San Francisco, CA, USA, Aug. 13-17, 2016, pp. 855-864, 2016.

William L. Hamilton, Zhitao Ying, and Jure Leskovec, In *Advances in Neural Information Processing Systems* 30: *Annual Conference on Neural Information Processing Systems* 2017, 4-9 Dec. 2017, Long Beach, CA, USA, pp. 1025-1035, 2017.

F. Maxwell Harper and Joseph A. Konstan, *TiiS,* 5(4): 19:1-19:19, 2016.

Diederik P Kingma and Jimmy Ba. Adam: In *International Conference on Learning Representations* (ICLR), 2015.

Thomas N Kipf and Max Welling, In *International Conference for Learning Representations* (ICLR), 2017.

Bryan Klimt and Yiming Yang, *First Conference on Email and Anti-Spam*, Jul. 30-31, 2004, Mountain View, California, USA, 2004.

Gueorgi Kossinets and Duncan J Watts, *Science,* 311(5757): 88-90, 2006.

Jure Leskovec, Jon M. Kleinberg, and Christos Faloutsos, *Densification and shrinking diameters.* TKDD, 1(1):2, 2007.

Jundong Li, et al., In *Proceedings of the 2017 ACM on Conference on Information and Knowledge Management,* CIKM 2017, Singapore, Nov. 6-10, 2017, pp. 387-396, 2017.

Zhouhan Lin et al., In *International Conference on Learning Representations* (ICLR), 2017.

Mathias Niepert, Mohamed Ahmed, and Konstantin Kutzkov, In *Proceedings of the 33nd International Conference on Machine Learning,* ICML 2016, New York City, New, York, USA, Jun. 19-24, 2016, pp. 2014-2023, 2016.

Pietro Panzarasa, Tore Opsahl, and Kathleen M. Carley, *JASIST,* 60(5):911-932, 2009.

Bryan Perozzi, Rami AI-Rfou, and Steven Skiena, In *The 20th ACM SIGKDD International Conference on Knowledge Discovery and Data Mining,* KDD '14, New York, NY, USA-Aug. 24-27, 2014, pp. 701-710, 2014.

Aravind Sankar, Xinyang Zhang, and Kevin Chen-Chuan Chang, CoRR, abs/1711.05697, 2017.

Peter Shaw, Jakob Uszkoreit, and Ashish Vaswani, In *Proceedings of the 2018 Conference of the North American Chapter of the Association for Computational Linguistics: Human Language Technologies,* NAACL-HLT, New Orleans, Louisiana, USA, Jun. 1-6, 2018, Volume 2 (Short Papers), pp. 464-468, 2018.

Tao Shen et al., In *Proceedings of the Thirty-Second AAAI Conference on Artificial Intelligence,* New Orleans, Louisiana, USA, Feb. 2-7, 2018, 2018.

Nitish Srivastava et al., *Journal of Machine Learning Research,* 15(1):1929-1958, 2014.

Zhixing Tan et al., In *Proceedings of the Thirty-Second AAAI Conference on Artificial Intelligence,* New Orleans, Louisiana, USA, Feb. 2-7, 2018, 2018.

Jian Tang et al., In *Proceedings of the 24th International Conference on World Wide Web,* WWW 2015, Florence, Italy, May 18-22, 2015, pp. 1067-1077, 2015. doi: 10.1145/2736277.2741093.

Joshua B Tenenbaum, Vin De Silva, and John C Langford, *science,* 290(5500):2319-2323, 2000.

Rakshit Trivedi, Hanjun Dai, Yichen Wang, and Le Song, In *Proceedings of the 34th International Conference on Machine Learning,* ICML 2017, Sydney, NSW, Australia, 6-11 Aug. 2017, pp. 3462-3471, 2017.

Ashish Vaswani et al., In *Advances in Neural Information Processing Systems 30: Annual Conference on Neural Information Processing Systems* 2017, 4-9 Dec. 2017, Long Beach, CA, USA, pp. 6000-6010, 2017.

Petar Velickovic et al., In *International Conference on Learning Representations* (ICLR), 2018.

Daixin Wang, Peng Cui, and Wenwu Zhu, In *Proceedings of the 22nd ACM SIGKDD International Conference on Knowledge Discovery and Data Mining,* San Francisco, CA, USA, Aug. 13-17, 2016, pp. 1225-1234, 2016. doi: 10.1145/2939672.2939753.

Zhen Wang, Jianwen Zhang, Jianlin Feng, and Zheng Chen, In *Proceedings of the Twenty-Eighth AAAI Conference on Artificial Intelligence,* Jul. 27-31, 2014, Qu'ebec City, Qu'ebec, Canada., pp. 1112-1119, 2014.

Adams Wei Yu et al., In *International Conference on Learning Representations* (ICLR), 2018.

Le-kui Zhou et al., In *Proceedings of the Thirty-Second AAAI Conference on Artificial Intelligence,* New Orleans, Louisiana, USA, Feb. 2-7, 2018, 2018.

Linhong Zhu et al., *IEEE Trans. Knowl. Data Eng.,* 28(10): 2765-2777, 2016.

What is claimed is:

1. A method comprising:
  extracting, by an analysis computer, a plurality of first datasets from a plurality of graph snapshots using a structural self-attention module;
  extracting, by the analysis computer, at least a second dataset from the plurality of first datasets using a temporal self-attention module across the plurality of graph snapshots;
  training, by the analysis computer, a machine learning model using at least the second dataset, wherein the machine learning model is an SVM or a neural network; and
  performing, by the analysis computer, graph context prediction with at least the second dataset.

2. The method of claim 1, wherein each graph snapshot of the plurality of graph snapshots comprises a plurality of nodes.

3. The method of claim 2, wherein the plurality of first datasets includes intermediate vector representations for each node for each snapshot of the plurality of graph snapshots.

4. The method of claim 3, wherein extracting the plurality of first datasets further comprises:
  for each graph snapshot of the plurality of graph snapshots, determining the intermediate vector representation for each node based on learned coefficients and the intermediate vector representations corresponding to neighboring nodes.

5. The method of claim 2, wherein the second dataset includes final node representations for a graph comprising the plurality of graph snapshots.

6. The method of claim 5, wherein each graph snapshot of the plurality of graph snapshots includes graph data associated with a timestamp.

7. The method of claim 6, wherein extracting the at least the second dataset further comprises:
  determining the final node representations for each node based on 4 weights and intermediate vector representations corresponding to neighboring nodes.

8. The method of claim 1, wherein performing the graph context prediction further comprises:
  performing, by the analysis computer, the graph context prediction with the second dataset and the machine learning model.

9. An analysis computer comprising:
  a processor; and
  a computer readable medium coupled to the processor, the computer readable medium comprising code, executable by the processor, for implementing a method comprising:
  extracting a plurality of first datasets from a plurality of graph snapshots using a structural self-attention module;
  extracting at least a second dataset from the plurality of first datasets using a temporal self-attention module across the plurality of graph snapshots;
  training a machine learning model using at least the second dataset, wherein the machine learning model is an SVM or a neural network; and
  performing graph context prediction with the second dataset and the machine learning model.

10. The analysis computer of claim 9 further comprising:
the structural self-attention module coupled to the processor; and
the temporal self-attention module coupled to the processor.

11. The analysis computer of claim 9, wherein a graph comprises the plurality of graph snapshots, wherein each graph snapshot is associated with a timestamp.

12. The analysis computer of claim 11, wherein each graph snapshot of the plurality of graph snapshots comprises a plurality of nodes, each node of the plurality of nodes connected to neighboring nodes of the plurality of nodes by an edge of a plurality of edges.

13. The analysis computer of claim 12, wherein the plurality of nodes represent entities and wherein the plurality of edges represent interactions between the entities.

14. The analysis computer of claim 12, wherein the plurality of first datasets includes intermediate vector representations for each node for each snapshot of the plurality of graph snapshots, and wherein the at least the second dataset includes final node representations for the graph comprising the plurality of graph snapshots.

15. The analysis computer of claim 14, wherein the intermediate vector representations and the final node representations are embeddings of each node in a vector space representative of characteristics of the plurality of nodes.

16. The analysis computer of claim 9, wherein the method further comprises:
receiving a prediction request from a requesting client;
determining a prediction based on at least performing graph context prediction with at least the second dataset; and
transmitting, to the requesting client, a prediction response comprising at least the prediction.

* * * * *